US012498669B2

United States Patent
Angervaks et al.

(10) Patent No.: US 12,498,669 B2
(45) Date of Patent: Dec. 16, 2025

(54) METHOD AND SYSTEM FOR SIMULTANEOUS RECORDING OF SUPERIMPOSED HOLOGRAPHIC GRATINGS FOR AUGMENTED REALITY DEVICES (VARIANTS)

(71) Applicant: Samsung Electronics Co., Ltd., Suwon-si (KR)

(72) Inventors: Aleksandr Evgenyevich Angervaks, St. Petersburg (RU); Roman Aleksandrovich Okun, St. Petersburg (RU); Gavril Nikolaevich Vostrikov, Moscow (RU); Nikolay Viktorovich Muravev, Podolsk (RU); Vladimir Nikolaevich Borisov, St. Petersburg (RU); Mikhail Vyacheslavovich Popov, Krasnogorsk (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 812 days.

(21) Appl. No.: 17/748,529

(22) Filed: May 19, 2022

(65) Prior Publication Data
US 2023/0032936 A1    Feb. 2, 2023

Related U.S. Application Data

(63) Continuation of application No. PCT/KR2022/006033, filed on Apr. 27, 2022.

(30) Foreign Application Priority Data

Jul. 29, 2021    (RU) .......................... RU2021122709

(51) Int. Cl.
   *G03H 1/28*    (2006.01)
   *G02B 27/01*   (2006.01)

(52) U.S. Cl.
   CPC ........... *G03H 1/28* (2013.01); *G02B 27/0103* (2013.01); *G02B 2027/0109* (2013.01);
   (Continued)

(58) Field of Classification Search
   None
   See application file for complete search history.

(56) References Cited

U.S. PATENT DOCUMENTS

| 6,266,167 B1 | 7/2001 | Klug et al. |
| 8,064,116 B2 | 11/2011 | Evans et al. |

(Continued)

FOREIGN PATENT DOCUMENTS

| CN | 101004641 A | 7/2007 |
| CN | 103765329 A | 4/2014 |

(Continued)

OTHER PUBLICATIONS

Okui et al., "Copying of holograms by spot scanning approach", Applied Optics vol. 57, No. 15, May 20, 2018.

(Continued)

*Primary Examiner* — Jyotsna V Dabbi
(74) *Attorney, Agent, or Firm* — Jefferson IP Law, LLP

(57) ABSTRACT

A method and systems for simultaneous recording of superimposed holographic gratings for augmented reality devices are provided. The method includes: generating a beam by a single light source, directing the beam to a decoherence unit at a predetermined angle, forming at least two recording beams by the decoherence unit by splitting the beam, forming at least two recording channels in the decoherence unit to transmit the at least two recording beams and output them from the decoherence unit, output angles of each of the at least two recording beams being different, illuminating a recording material layer and one master diffractive optical element/master holographic optical element (master DOE/

(Continued)

HOE) comprising at least one preliminary formed diffraction/holographic grating by the at least two non-interfering recording beams, simultaneously forming at least two superimposed holographic gratings from the master DOE/HOE on or in the recording material layer.

17 Claims, 18 Drawing Sheets

(52) U.S. Cl.
CPC ..... *G03H 2222/33* (2013.01); *G03H 2222/42* (2013.01); *G03H 2222/43* (2013.01); *G03H 2223/23* (2013.01)

(56) References Cited

U.S. PATENT DOCUMENTS

| | | | |
|---|---|---|---|
| 9,785,114 | B2 | 10/2017 | Fuetterer |
| 10,359,736 | B2 | 7/2019 | Popovich et al. |
| 10,859,833 | B2 | 12/2020 | Bablumyan |
| 11,327,312 | B2 | 5/2022 | Robaina et al. |
| 2005/0259299 | A1* | 11/2005 | El Hafidi ............... G03H 1/202 359/10 |
| 2008/0231925 | A1 | 9/2008 | Tateishi et al. |
| 2012/0008482 | A1 | 1/2012 | Bablumyan et al. |
| 2014/0154614 | A1 | 6/2014 | Xie et al. |
| 2014/0230897 | A1* | 8/2014 | Waldman ............. G03H 1/0248 136/259 |
| 2014/0329172 | A1* | 11/2014 | Hart ........................ G03H 1/04 355/2 |
| 2018/0210396 | A1 | 7/2018 | Popovich et al. |
| 2019/0250563 | A1* | 8/2019 | Tsen ..................... G03H 1/2645 |
| 2019/0339558 | A1 | 11/2019 | Waldern et al. |
| 2019/0391375 | A1* | 12/2019 | Fahrbach ............... G02B 21/06 |
| 2020/0225416 | A1 | 7/2020 | Bablumyan et al. |
| 2020/0368616 | A1 | 11/2020 | Delamont |

FOREIGN PATENT DOCUMENTS

| | | |
|---|---|---|
| CN | 106662754 A | 5/2017 |
| CN | 109374259 A | 2/2019 |
| RU | 2 719 568 C1 | 4/2020 |
| WO | 79/00433 A1 | 7/1979 |
| WO | 02/043195 A2 | 5/2002 |
| WO | WO-2009056356 A2 * | 5/2009 ........... G03H 1/0011 |
| WO | 2015/184413 A1 | 12/2015 |
| WO | 2018/031634 A1 | 2/2018 |
| WO | 2018/224847 A2 | 12/2018 |
| WO | 2019/217409 A1 | 11/2019 |

OTHER PUBLICATIONS

Bruder et al., "Mass production of volume holographic optical elements (vHOEs) using Bayfol(R) HX photopolymer film in a roll-to-roll copy process", Proceedings of SPIE, vol. 10127, Apr. 6, 2017.

Russian Notice of Allowance dated Apr. 18, 2022, issued in Russian Application No. 2021122709.

International Search report and written opinion dated Jul. 8, 2022, issued in International Application No. PCT/KR2022/006033.

* cited by examiner

METHOD AND SYSTEM FOR SIMULTANEOUS RECORDING OF SUPERIMPOSED HOLOGRAPHIC GRATINGS FOR AUGMENTED REALITY DEVICES (VARIANTS)

CROSS-REFERENCE TO RELATED APPLICATION(S)

This application is a continuation application, claiming priority under § 365(c), of an International application No. PCT/KR2022/006033, filed on Apr. 27, 2022, which is based on and claims the benefit of a Russian patent application number 2021122709, filed on Jul. 29, 2021, in the Russian Patent Office, the disclosure of which is incorporated by reference herein in its entirety.

FIELD OF THE INVENTION

The disclosure relates to methods and systems for recording superimposed holographic gratings for augmented reality devices (AR devices, more specifically, the devices based on the waveguide technology using diffractive and holographic optical elements, hereinafter referred to as DOE/HOE elements), for example, augmented reality glasses, HUD devices and virtual displays, displays based on plane waveguides with diffractive and holographic structures, i.e., in projection optical means using augmented reality technology, for example, for educational purposes, in computer games, in medicine, sports, three-dimensional (3D) modeling, design, for navigation purposes, etc.

DESCRIPTION OF THE RELATED ART

Augmented reality devices are ever more extensively used in the state-of-the art technology.

Related art augmented reality devices (AR devices) based on the waveguide technology using diffractive and holographic structures, such as augmented reality glasses and virtual displays, are capable of transferring virtual image into the viewer s eye.

AR devices intended for mainstream use should provide wide field-of-view (FOV) virtual images having high brightness, contrast and high resolution, while maintaining an affordable cost. At the same time, to ensure a high-quality virtual image in AR-devices based on waveguide holographic structures, particular emphasis should be given to the quality of recorded holograms.

To produce a virtual image with a large field of view in such AR devices, the technology of recording superimposed holograms is used on a quite wide scale. Superimposed holograms are recorded such that they have the same surface period, but different spatial periods, i.e., they have different tilt of the holographic planes in the volume of the holographic medium. The increased field of view, accordingly, improves the consumer properties of the AR devices. However, a serious problem arises when superimposed holograms are recorded sequentially. At the transition from recording one hologram to recording another hologram, a slight detuning of the recording scheme occurs, which, in turn, leads to mismatches between surface periods of the recorded superimposed holograms and/or rotations of the holographic planes of the recorded holograms relative to each other. These effects are small in absolute values, but rather strong in comparison with the wavelength of the radiation recording the hologram. This causes moiré, a parasitic interference between superimposed holograms, which, in turn, impairs the virtual image quality—its sharpness decreases and brightness becomes non-homogeneous across the eyebox and field of view.

The disclosure is directed at the development of a method of recording superimposed holograms, excluding sequential recording of superimposed holograms, and relates to a system for providing said recording of superimposed holograms to produce a high-quality output virtual image and simplify the process of recording superimposed holograms in AR devices.

The main problems of sequential recording of superimposed holograms in AR devices are:

1) Recording system requires readjustment between sequential recordings of superimposed holograms due to the difference in their spatial periods, which results in mismatch between surface periods of the superimposed holograms being recorded and/or small rotations of their holographic planes in the sequential recording process, causing moiré and impairing the virtual image quality (its sharpness and brightness across the field of view and the eyebox).

2) Sequential recording of superimposed holograms is a laborious process that requires a significant human resource, since it is necessary to select recording regime for each subsequently recorded hologram, i.e., exposure time, power of recording radiation. For this purpose, experimental studies are needed to select the recording conditions for obtaining identical characteristics of the recorded holograms, since each recorded hologram, due to the chemical and physical properties of the holographic medium in which it is recorded, affects the subsequent recorded hologram, and this can lead, in particular, to degradation of the recorded holograms. Any inaccuracy in the selection of recording parameters for each recorded hologram deteriorates quality of the resulting virtual image.

3) The process of sequential recording of holograms requires a rather sophisticated optical scheme comprising precision elements, including rotary and tilting stages and linear translators, so significant financial and operational expenditures are needed. Thus, sequential recording of superimposed holograms is a complex, elaborate process and difficult to reproduce for mass production due to the complexity of the recording scheme and the need for its adjustment, as well as significant labor input, which increase the cost of the recording process.

Various techniques for producing and replicating holographic elements are known in the art.

The related art describes a method for replication (copying) of volume holographic optical elements (HOE) using a master HOE in optical contact with a prism.

The master HOE is illuminated by reading radiation, the radiation diffracts on the master HOE, and the beams (signal and reference) diffracted on the master HOE propagate further along the prism and then leave it. Moreover, the master HOE is calculated such that the beams diffracted on the master hologram interfere with each other at a certain distance from the prism. This area comprises a holographic medium, in which a copy of the master HOE is thereby recorded. It should be noted that the beams transmitted through the prism, not diffracted on the master HOE, experience total internal reflection in the prism; therefore, they exit through its other face and, thus, do not create a parasitic background illumination of the copy recording area. Therefore, the master HOE copy has a high contrast even with a rather weak efficiency of the master HOE.

The optical structure is rather cumbersome, and the copy recording optical scheme can be instable due to the clearance between the prism and the holographic medium layer. In addition, the disclosed optical structure provides only sequential copying of the master HOE in the form of recorded holographic grating copies, which is accompanied by some disadvantages inherent in the sequential recording of superimposed holograms, disclosed in detail in description.

Other related art describes a method and apparatus for recording holograms, in particular, 3D holograms. A holographic recording system (1) comprises an optical radiation source (7), a transparent or semi-transparent holographic medium (6), and an optical system (10). The holographic medium (6) has a first side (25), a second side (26) opposite to the first side (25), and a recording volume (30) between the two sides. The holographic medium is positioned (6) between the optical radiation source (7) and the optical system (10) such that the first side (25) is presented toward the light source (7), and the second side is presented toward the optical system (10). The radiation source (7) is arranged to project incident optical radiation (20) onto the first side (25) and through the recording volume (36) towards the optical system (10). The optical system (10) is arranged to redirect (32) the optical radiation back onto the second side (26) and into the recording volume (36) so that the incident (20) and redirected (32) radiation intersect within the recording volume (36) at an obtuse angle (34) to create an interference pattern (38) from which a holographic recording may be made. The method and apparatus enable recording holograms in different areas of the recording volume, or next to each other; sequential recording of superimposed holograms is also possible, but this technique does not allow simultaneous recording of superimposed holograms.

Other related art describes a method for producing holograms using two master holograms. A first master hologram is a stack of superimposed holograms illuminated by reading radiation, and the reading beam diffracts on each hologram with low diffraction efficiency, but said stack of holograms in total provides sufficient diffraction efficiency. At interference of the radiation diffracted and transmitted through each hologram of the radiation stack, a second intermediate master hologram is recorded, which is used to record the final hologram copy. The method enables varying the parameters of the second intermediate master hologram by changing the angle of incidence of the reading beam onto the first master hologram, so hologram copies with different parameters can be recorded. The recording scheme is rather complicated (the presence of a stack of holograms; the final hologram copy is recorded via an intermediate master hologram, creating additional problems during recording). In addition, the process of recording hologram copies is accomplished sequentially, and this technique precludes simultaneous recording of superimposed holograms.

Other related art describes an apparatus and method for replicating a hologram using a copying beam steerable by the angle of direction. The apparatus comprises an assembly operable to position a hologram (master) in proximity to holographic recording material in which copy is recorded, and a copying beam steering unit operable to independently control the direction of the beam toward portions of the hologram to replicate the hologram into the volume of the holographic medium. Therefore, copies with different characteristics can be produced owing to the ability of varying the direction of incidence of the beam on the master hologram. However, this scheme provides only sequential recording of holograms in the volume of holographic medium, and this technique precludes simultaneous recording of superimposed holograms.

Other related art describes methods and apparatuses for copying a diversity of hologram prescriptions from a common master. According to the apparatus scheme, initial beam 102 is incident on a pre-calculated optical element 103, which is designed so that it modifies the initial incident radiation and, accordingly, the wavefront of secondary radiation (116, 117) is distorted as compared to the initial incident radiation wavefront. The distorted secondary wavefront is incident on the master hologram, while the distorted wavefront consists of a set of components, each having own direction of propagation and own phase. Components of the distorted wavefront diffract in each part of the master hologram, and the diffracted beams interfere with the beams that have passed through the master hologram. Thus, interference occurs between the diffracted beams and the beams that have passed through the master hologram at each point of the holographic medium brought into contact with the master hologram, and holographic copies with different grating characteristics, for example, periods of gratings and tilt of holographic planes, are recorded at each point of the holographic medium. The scheme uses one light source, one common master hologram; multiple copies of one common master hologram are recorded simultaneously in one recording step, but the recorded master holograms are disposed in different places in the volume of the holographic medium. The scheme precludes simultaneous recording of superimposed holograms with different parameters in one place of the holographic medium, which is achieved in the disclosure.

The present inventors have overcome all the disadvantages of the closest related art and provide a method and system for simultaneous recording of superimposed holographic gratings for augmented reality devices, which ensure a high-quality output virtual image and simplify the process of recording of superimposed holograms in AR devices at the same time.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide a method and system of simultaneous recording of superimposed holographic gratings for an augmented reality device.

Additional aspects will be set forth in part in the description which follows and, in part, will be apparent from the description, or may be learned by practice of the presented embodiments.

In accordance with an aspect of the disclosure, a method of simultaneous recording of superimposed holographic gratings for an augmented reality device is provided. The method includes the steps of generating an initial beam by a single light source, directing the initial beam to a decoherence unit at a predetermined angle, providing the formation of at least two recording beams by the decoherence unit, including splitting the initial beam into at least two recording beams, forming at least two recording channels in the decoherence unit to transmit the at least two recording beams and output them from the decoherence unit, wherein the output angles of each of the formed at least two recording beams are different, the formed at least two recording beams are non-interfering when leaving the decoherence unit, which is provided in accordance with at least one of the parameters the output time (t) of each of the at least two recording beams, the spatial position of each of the at least two recording beams, the polarization state of each of the at least two recording beams, the spectral composition of each of the at least two recording beams, illuminating a recording material layer and one master diffractive optical element/ master holographic optical element (master DOE/HOE) comprising at least one preliminary formed diffraction/ holographic grating by said at least two non-interfering recording beams, providing simultaneous formation of at least two superimposed holographic gratings from said one master DOE/HOE on or in the recording material layer, the formed superimposed holographic gratings having the same surface period, but a different spatial period.

Moreover, the initial beam is one of continuous coherent beam, continuous partially coherent beam, pulsed coherent beam, pulsed partially coherent beam.

In the method, the step of formation of at least two superimposed holographic gratings from said one master DOE/HOE on or in the recording material layer comprises diffracting the recording beams on the at least one diffraction/holographic grating preliminary formed on or in the master DOE/HOE, and then interfering the diffracted and recording beams with each other on or in the recording material layer to provide recording of at least two superimposed holographic gratings.

According to the method, parameters of the recorded superimposed holographic gratings are adjusted by rotation or linear displacement of the recording material layer and the master DOE/HOE relative to the at least two recording beams incident on the recording material layer and the master DOE/HOE, between recording cycles.

Furthermore, rotation or linear displacement of the recording material layer and the master DOE/HOE relative to each other between recording cycles is provided for adjusting parameters of the superimposed holographic gratings being recorded.

Moreover, in the method, at a one-segment recording of a holographic grating, the diffraction efficiency is varied along the X-axis or along the Y-axis of the field of the recorded holographic grating, while when performing multiple-segment recording of a holographic grating on or in the layer of the recording material, the diffraction efficiency is varied in the segments constituting the multiple-segment recorded holographic grating.

Moreover, said varying of the diffraction efficiency in the segments is performed along the X-axis or along the Y-axis of the field of respective segment of the multiple-segment recorded holographic grating on or in the recording material layer, and the segments constituting the multiple-segment recorded holographic grating are adjacent or spaced apart from each other by a predetermined distance.

Furthermore, said varying of the diffraction efficiency of the recorded holographic grating on or in the recording material layer is performed by changing energy characteristics of the recording beams.

In the method according to the disclosure, angle $\theta_i$ of incidence of the recording beam on the recording material layer and the master DOE/HOE is determined by the Equation:

$$\theta_i = \sin^{-1}\left[n\left(\lambda/(dn) - \sin\left(\sin^{-1}\left(\frac{\lambda}{2nd_{spati}}\right) + \cos^{-1}\left(\frac{d_{spati}}{d}\right)\right)\right)\right],$$

where i is the number of the recording beam, n is the refractive index of the recording material layer, $\lambda$ is the wavelength of the initial beam from the light source, d is the surface period of each recorded grating, $d_{spati}$ is the spatial period of i-th grating recorded.

In accordance with another aspect of the disclosure, a system for simultaneous recording of superimposed holographic gratings for augmented reality devices is provided. The system includes a light source operable to generate an initial beam, a decoherence unit operable to form and output at least two recording beams, wherein the decoherence unit is configured such that the output angles of each of the formed at least two recording beams are different, and the formed at least two recording beams are non-interfering when leaving the decoherence unit, which is provided in accordance with at least one of the parameters the output time (t) of each of the at least two recording beams, the spatial position of each of the at least two recording beams, the polarization state of each of the at least two recording beams, the spectral composition of each of the at least two recording beams, a recording material layer capable of forming on or in it at least two superimposed holographic gratings, the formed superimposed holographic gratings having the same surface period, but a different spatial period, a master diffractive optical element (DOE)/master holographic optical element (HOE) (master DOE/HOE) comprising at least one preliminarily formed diffractive/holographic grating, positioned in direct contact with the recording material layer or at a predetermined distance from the recording material layer to ensure interaction of the recording beams with the master DOE/HOE and the recording material layer, a control unit connected to the light source, the decoherence unit and to the DOE/HOE master and the recording material layer, and operable to control said units by a signal from the control unit.

Moreover, the light source is operable to form an initial continuous coherent electromagnetic radiation with an optical wavelength or a pulsed initial radiation, and the light source is a pulsed laser.

In the system according to the disclosure, the light source is operable to generate an initial beam, which is one of continuous coherent beam, continuous partially coherent beam, pulsed coherent beam, pulsed partially coherent beam.

Moreover, the light source is operable to direct the initial beams at a predetermined angle to the decoherence unit, the decoherence unit comprises an optical forming unit operable to form at least two recording channels, the optical forming unit is operable to form at least two recording channels, each for transmitting a respective recording beam, or the optical forming unit comprises, optically coupled, a beam splitter, at least one mirror element, and at least two optical beam shutters.

Moreover, the beam splitter is a beam splitting cube which is configured to geometrically and energetically split the initial beam into at least two recording beams.

In the system according to one embodiment, at least two optical beam shutters provide alternate or simultaneous output of the recording beams from the decoherence unit by a signal from the control unit.

According to one embodiment, the optical forming unit comprises, optically coupled, a beam splitter in the form of a beam splitting cube, a mirror element and a polarizer, wherein the polarizer is configured to provide alternate or simultaneous output of at least two recording beams from the decoherence unit depending on the direction of the polarization vector of each of the at least two recording beams when passing through the polarizer, the direction of the polarization vector being one of S-polarization, P-polarization, right-handed circular polarization (RHCP), left-handed circular polarization (LHCP), moreover, the polarizer is configured to provide orthogonality of the polarization vectors of the at least two recording beams, while the recording beams leave the decoherence unit simultaneously.

Furthermore, the alternate or simultaneous output of the at least two recording beams from the decoherence unit is performed by a signal from the control unit.

According to one embodiment, the optical forming unit comprises at least one microelectromechanic (MEMS) system providing alternate output of the recording beams from the decoherence unit by a signal from the control unit.

According to one embodiment, the optical forming unit comprises, optically coupled, a beam splitter in the form of a beam splitting cube, and at least one optical delay line, and the at least one optical delay line is configured to delay the recording beam in at least one recording channel of the at least two recording channels to provide alternate output of the recording beams from the decoherence unit.

Moreover, the at least one optical delay line is configured to delay the recording beam in at least one recording channel of the at least two recording channels to provide a path difference of the recording beams in the recording channels, exceeding the coherence length of the initial light source, while providing simultaneous output of the at least two recording beams from the decoherence unit.

Moreover, the optical delay line is an optical fiber, or an assembly of a set of mirror elements configured to adjust the path of at least one recording beam in the decoherence unit, or the optical delay line is an extended optical medium with a refractive index n>1.5, providing a delay of the recording beam in at least one recording channel of the at least two recording channels, wherein the extended optical medium is a parallelepiped made of optical material.

According to one embodiment, the optical forming unit comprises, optically coupled, an optical beam shutter positioned in the path of the initial beam, a beam splitter in the form of a beam splitting cube, and a mirror element, or the optical forming unit comprises, optically coupled, a beam splitter in the form of a beam splitting cube and a mirror element, and at least two spectral filters positioned in each recording channel.

Furthermore, the master DOE/HOE is mounted in a fixed position relative to the recording material layer with the ability of rotation or linear displacement of the recording material layer and the master DOE/HOE relative to the at least two recording beams incident on the recording material layer and the master DOE/HOE, between recording cycles by a signal from the control unit to adjust parameters of the superimposed holographic gratings being recorded, or the recording material layer and the master DOE/HOE are mounted with the ability of rotation or linear displacement relative to each other between recording cycles to adjust parameters of the superimposed holographic gratings recorded on or in the recording material layer by a signal from the control unit.

Moreover, the control unit is configured to adjust parameters of the superimposed holographic gratings recorded on or in the recording material layer by rotating or linearly displacing the recording material layer and the master DOE/HOE relative to the at least two recording beams incident on the recording material layer and the master DOE/HOE, between recording cycles by a signal from the control unit, and the control unit is operable, when performing one-segment recording of a holographic grating as a whole, to vary the diffraction efficiency along the X-axis or along the Y-axis of the field of the one-segment holographic grating recorded on or in the layer of the recording material.

Furthermore, the control unit is operable, when performing multiple-segment recording of a holographic grating on or in the recording material layer, to vary the diffraction efficiency in the segments that constitute the multiple-segment recorded holographic grating.

Moreover, the control unit is operable to vary the diffraction efficiency in segments along the X-axis or Y-axis of the field of respective segment of the multiple-segment recorded holographic grating on or in the recording material layer, and the segments constituting the multiple-segment recorded holographic array are adjacent or spaced apart from each other by a predetermined distance.

Furthermore, in the system according to the second aspect of the disclosure, said varying of the diffraction efficiency of the recorded holographic grating on or in the recording material layer is performed by changing energy characteristics of the recording beams formed by the decoherence unit, and said adjustment of parameters of the superimposed holographic gratings recorded on or in the layer of the recording material involves at least one parameter of period of the holographic grating, diffraction efficiency of the holographic grating, size of the holographic grating.

Furthermore, the system according the second aspect of the disclosure further comprises a mask configured to form the shape of the segments constituting the recorded superimposed holographic gratings on or in the layer of the recording material, and at least one rotary stage and at least one linear translator to provide rotation and linear displacement of the DOE/HOE master and the recording material layer.

Furthermore, in the system, angle $\theta_i$ of incidence of the recording beam on the recording material layer and the master DOE/HOE is determined by the Equation:

$$\theta_i = \sin^{-1}\left[n\left(\lambda/(dn) - \sin\left(\sin^{-1}\left(\frac{\lambda}{2nd_{spati}}\right) + \cos^{-1}\left(\frac{d_{spati}}{d}\right)\right)\right)\right],$$

where i is the number of the recording beam, n is the refractive index of the recording material layer, $\lambda$ is the wavelength of the initial beam from the light source, d is the surface period of each recorded grating, $d_{spati}$ is the spatial period of the i-th grating being recorded.

In accordance with another aspect of the disclosure, a system for simultaneous recording of superimposed holographic gratings for augmented reality devices is provided. The system includes a coherent light source operable to form a continuous initial coherent beam, a decoherence unit operable to form and output at least two recording beams, wherein the decoherence unit is configured such that the output angles of each of the formed at least two recording beams are different, and the formed at least two recording beams are non-interfering when leaving the decoherence unit, wherein the decoherence unit comprises an optical forming unit operable to form at least two recording channels, each for transmitting a respective recording beam, wherein said optical forming unit comprises, optically coupled, a beam splitter, at least one mirror element and at least two optical beam shutters adapted to alternately output the recording beams from the decoherence unit in accordance with output time (t) of each of the at least two recording beams, a recording material layer capable of forming on or in it at least two superimposed holographic gratings, the formed superimposed holographic gratings having the same surface period, but a different spatial period, a master diffractive optical element/master holographic optical element (master DOE/HOE) comprising at least one preliminarily formed diffractive/holographic grating, positioned in direct contact with the recording material layer or at a predetermined distance from the recording material layer to ensure interaction of the recording beams with the master DOE/HOE and the recording material layer, a control unit connected to the light source, the decoherence unit and to the DOE/HOE master and the recording material layer, and operable to control said units by a signal from the control unit.

Moreover, angle $\theta_i$ of incidence of the recording beam on the recording material layer and the master DOE/HOE is determined by the Equation:

$$\theta_i = \sin^{-1}\left[n\left(\lambda/(dn) - \sin\left(\sin^{-1}\left(\frac{\lambda}{2nd_{spati}}\right) + \cos^{-1}\left(\frac{d_{spati}}{d}\right)\right)\right)\right],$$

where i is the number of the recording beam, n is the refractive index of the recording material layer, $\lambda$ is the wavelength of the initial beam from the light source, d is the surface period of each recorded grating, $d_{spati}$ is the spatial period of the i-th grating being recorded.

Moreover, the recording material layer is a holographic medium layer, the light source is operable to generate an initial continuous coherent electromagnetic radiation with an optical wavelength, and to direct the initial beam at a predetermined angle to the decoherence unit.

In the system according to the disclosure, the beam splitter is a beam splitting cube which is configured to geometrically and energetically split the initial beam into at least two recording beams.

In the system according to the disclosure, the master DOE/HOE is mounted in a fixed position relative to the recording material layer with the ability of rotation or linear displacement of the recording material layer and the DOE/HOE master relative to the at least two recording beams incident on the recording material layer and the master DOE/HOE, between recording cycles to adjust parameters of the superimposed holographic gratings being recorded, or the recording material layer and the master DOE/HOE are mounted with the ability of rotation or displacement relative to each other between recording cycles to adjust parameters of the superimposed holographic gratings recorded on or in the recording material layer by a signal from the control unit.

In the system according to the disclosure, the control unit is operable to adjust parameters of the superimposed holographic gratings recorded on or in the recording material layer by rotating or linearly displacing the recording material layer and the master DOE/HOE relative to the at least two recording beams incident on the recording material layer and the master DOE/HOE, between recording cycles by a signal from the control unit, and the control unit is operable, when performing one-segment recording of a holographic grating, to vary the diffraction efficiency along the X-axis or along the Y-axis of the field of the one-segment holographic grating recorded on or in the layer of the recording material.

Furthermore, the control unit is operable, when performing multiple-segment recording of a holographic grating on or in the recording material layer, to vary the diffraction efficiency in the segments that constitute the multiple-segment recorded holographic grating, or the control unit is operable to vary the diffraction efficiency in segments along the X-axis or Y-axis of the field of respective segment of the multiple-segment recorded holographic grating on or in the recording material layer.

Moreover, the segments constituting the multiple-segment recorded holographic array are adjacent or spaced apart from each other by a predetermined distance.

In the system according to the disclosure, said varying of the diffraction efficiency of the recorded holographic grating on or in the recording material layer is performed by changing energy characteristics of the recording beams formed by the decoherence unit, and said varying of parameters of the superimposed holographic gratings recorded on or in the recording material layer involves at least one parameter of period of the holographic grating, diffraction efficiency of the holographic grating, size of the holographic grating.

In the system according to the disclosure further comprises a mask configured to form the shape of the segments constituting the recorded superimposed holographic gratings, a rotary stage and/or a linear translator to provide rotation and linear displacement of the master DOE/HOE and the recording material layer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DESCRIPTION OF PREFERRED EMBODIMENT

Figure 1:
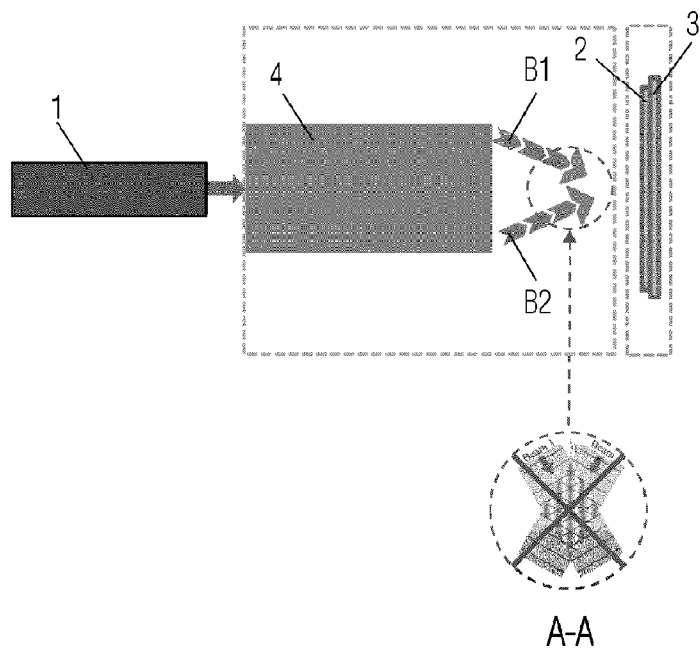
FIG. 1 is a schematic diagram of simultaneous recording of superimposed holographic gratings according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All of the documents mentioned herein form an integral part of the disclosure, i.e., their disclosures are fully incorporated into this description by reference.

In this document, the statement of ranges of values is not intended to be limiting, but is intended to apply individually to any and all values falling within the ranges, unless otherwise indicated in this application, and each individual value within such ranges is included in the description of the disclosure, as if it were individually given in the application.

The use of specific compositions of materials used in the manufacture of structural components that are an integral part of the claimed disclosure is not limited to the presented examples, but allows the use of any other compositions with similar properties known to those skilled in the art.

The words "about," "around" or similar used with a numerical value are to be understood by a person skilled in the art to indicate the deviation that will provide satisfactory performance in the intended field of application. Likewise, words referring to an approximate meaning, such as "approximately" or "substantially," when used with respect to physical characteristics, should be understood by a person skilled in the art as defining the range of deviation at which satisfactory performance is ensured at appropriate use, functioning, intended designation or the like.

Ranges of values and/or numerical values are given herein by way of example only and do not impose restrictions on the scope of the described embodiments. When ranges of values are given, they are intended to include each value within the range as if it were presented individually, unless otherwise noted. The use of any or all of the examples, or an introductory word before the example ("for example," "such as" or the like) provided in this application is intended only to better elucidate the embodiments and is not a limitation on the scope of the embodiments. Nothing in the description should be construed as showing any unclaimed element essential to the practical application of the embodiments.

Within the scope of this description, the terms "hologram" and "holographic grating" are used interchangeably.

Within the scope of the disclosure, the concept of "augmented reality (AR)" is considered as a technology by which virtual objects can be superimposed on a real scene, and virtual information can be applied to the real world so that the real scene and virtual objects are superimposed into one image or space in real time, and can be viewed by an observer, thereby providing an immersive augmented reality experience.

The term "eyebox" refers to the amount of space in which a virtual image is observed.

The term "recording beam aperture" refers to the transverse dimension of a beam, determined by its diameter.

Hologram copy is a hologram produced by copying, i.e., reproducing the hologram structure of the original hologram or master diffractive optical element (DOE) in a recording medium (recording material, holographic medium) of the hologram copy.

Recording material refers to a substance used to record a holographic field. In the scope of this description, the terms "recording material," "holographic medium" are used interchangeably.

Master DOE is a diffractive optical element designed to produce a hologram copy.

Master holographic optical element (HOE) is a holographic optical element designed to produce a hologram copy.

Moreover, master HOE can be a case of implementing the master DOE.

It should be noted that both diffractive optical element (DOE) and holographic optical element (HOE) are based substantially on the same physical principle, that is, both types of optical elements can be substantially classified as diffractive optical elements. The difference between them is that diffractive optical elements are optical elements in which diffraction occurs on the surface relief, while holographic optical elements are gratings in which diffraction occurs in the material due to a local change in its optical properties.

Within the scope of the disclosure, the concept of "copying a hologram" is considered as a technology of recording a hologram, since the result of both actions is the formation of a hologram structure in a recording medium.

Recording cycle is a set of actions of a holographic grating recording system, at which each recording channel functions no more than once.

Recording a holographic grating as a whole (one-segment recording) refers to recording a grating, at which the size of the grating will be equal to the aperture of the recording beam or the size of the mask limiting the aperture of the recording beam.

Multiple-segment recording of a holographic grating (recording in multiple segments) refers to a recording of grating, at which its size will be equal to the sum of sizes of separate segments that constitute it.

Hereafter, preferred embodiments of the disclosure will be described.

As already mentioned above, the inventors have overcome all the disadvantages of the closest related art and provided a method and system for simultaneous recording of superimposed holographic gratings for augmented reality devices, which ensure a high-quality output virtual image and at the same time simplify the process of recording superimposed holograms in AR devices.

Similarly to the closest related art, the disclosure uses one light source, one master DOE/HOE, and performs simultaneous recording of multiple hologram copies with different parameters, but the hologram copies produced according to the related art are not superimposed, they are rather recorded in various separate parts of holographic medium.

Thus, in the closest related art, hologram copies with different characteristics are not recorded in one place, they are rather distributed over the holographic medium space, i.e., a general hologram copy with smoothly varying characteristics along one coordinate is recorded.

The inventors circumvent the disadvantages of the closest related art, specifically, the hologram recording system has been simplified, and a higher quality virtual image is achieved through refusing from traditional two-beam sequential recording of superimposed holograms in the holographic medium volume.

As a result of experimental research, a recording method and system have been developed, which have the following key points:
  a decoherence unit is provided for destroying the coherence of recording beams, which ensures the formation of at least two non-interfering recording beams to provide recording of superimposed holographic gratings from one master DOE/HOE by one coherent light source;
  simultaneous recording of superimposed holographic gratings from one master DOE/HOE from one coherent light source.

Figure 3A:
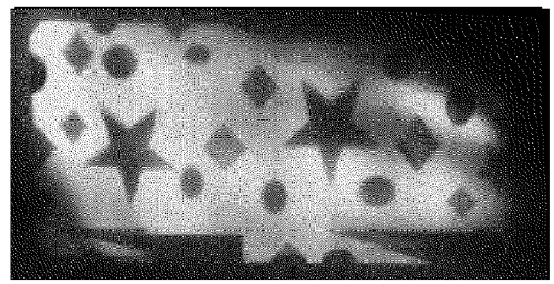
FIG. 3A is a virtual image formed by methods of sequential recording of superimposed holographic gratings according to the related art.
Figure 3B:
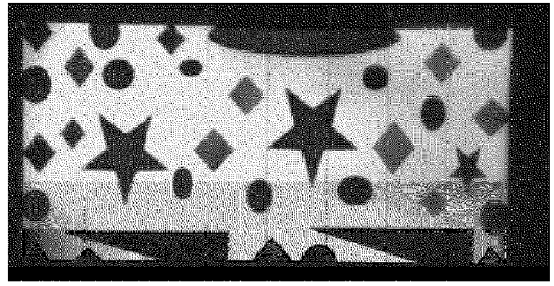
FIG. 3B is a virtual image formed by a method of simultaneous recording of superimposed holographic gratings according to an embodiment of the disclosure.

Concurrently, quality of the resulting virtual image is improved, ensuring uniform brightness of the image over the field of view and clarity of the image, as clearly demonstrated in FIG. 3B, compared to the virtual image produced by sequential recording system, shown in FIG. 3A.

FIG. 1 schematically shows the general principle of simultaneous recording of superimposed holograms according to an embodiment of the disclosure.

A coherent light source 1 generates continuous coherent light in the form of a beam, which enters a unit 4 for destroying the coherence of recording beams (hereinafter referred to as decoherence unit), which forms at least two non-interfering recording beams (see A-A in FIG. 1) (FIG. 1 conventionally shows two beams B1, B2); then the at least two said formed recording beams are alternately output towards a holographic medium layer 2 and a master DOE/HOE 3; the beams illuminate the holographic medium layer 2 and the master DOE/HOE 3 positioned in direct contact with the holographic medium layer 2 or at a predetermined distance from it.

It should be noted that the light source is operable to generate an initial beam, which can be one of: continuous coherent beam, continuous partially coherent beam, pulsed coherent beam, pulsed partially coherent beam.

Furthermore, the light source, which forms a partially coherent beam or a pulsed partially coherent beam, provides formation of continuous radiation or pulsed radiation, which can be considered as a combination of coherent and incoherent light. The light source, for example, can be quasi-monochromatic light source that emits a set of wavelengths in a certain spectral range, for example, light emitting diode (LED).

The light source is one of: diode-pumped continuous-wave solid state laser, semiconductor laser, laser diode, light-emitting diode, light-emitting diode (LED) array, etc.

Figure 2A:
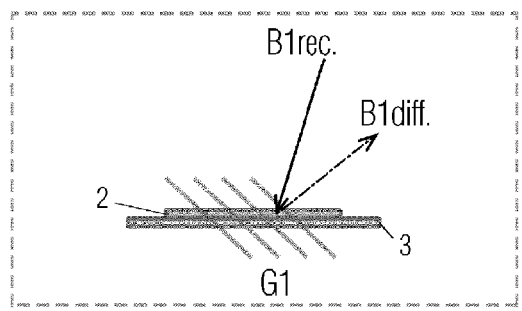
FIG. 2A is a schematic diagram of formation of a first superimposed holographic grating according to an embodiment of the disclosure.
Figure 2B:
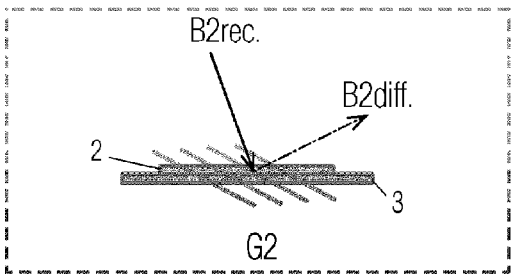
FIG. 2B is a schematic diagram of formation of a second superimposed holographic grating according to an embodiment of the disclosure.

FIGS. 2A and 2B schematically show processes of simultaneous recording of holographic gratings for beams B1 (FIG. 2A) and B2 (FIG. 2B), respectively according to various embodiments of the disclosure.

The recording beams B1 and B2 (denoted as $B1_{re}$, and $B2_{re}c$ in FIG. 2B) illuminate the holographic medium layer 2 and the master DOE/HOE 3, and part of the beams diffracts ($B1_{diff}$, $B2_{diff}$) on the master DOE/HOE 3; at the same time, the diffracted ($B1_{diff}$, $B2_{diff}$) and recording beams ($B1_{rec}$, $B2_{rec}$) interfere, respectively, with each other, i.e., at each point of the recording (holographic) material layer 2, brought into contact with the master DOE/HOE 3, interference occurs between diffracted beams and recording beams, with simultaneous recording of superimposed holographic gratings G1 and G2 in the holographic medium layer 2, designated as G1 in FIG. 2A and G2 in FIG. 2B.

Figure 4A:
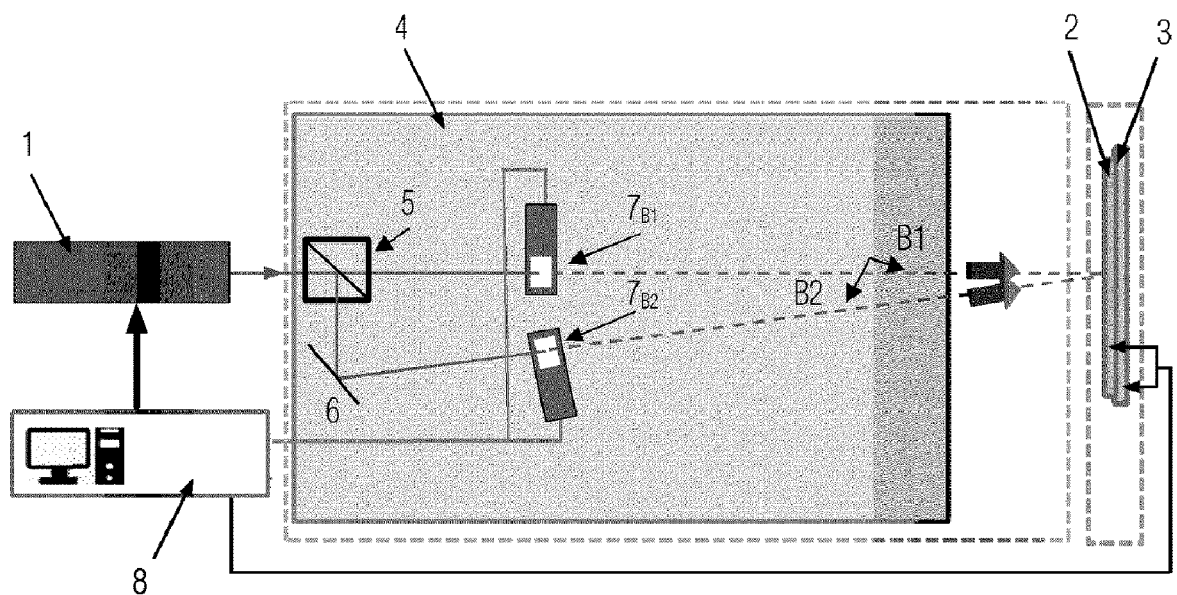
FIG. 4A is a schematic view of a system for simultaneously recording superimposed holographic gratings according to an embodiment of the disclosure.
Figure 4B:
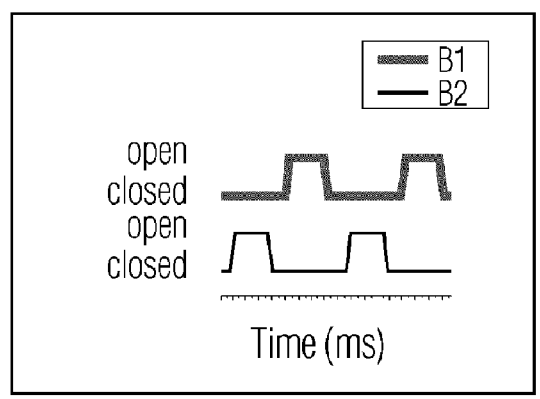
FIG. 4B shows sequence diagrams illustrating operation of two optical beam shutters $7_{B1}$, $7_{B2}$ for two recording beams B1 and B2, respectively according to an embodiment of the disclosure.
Figure 4C:
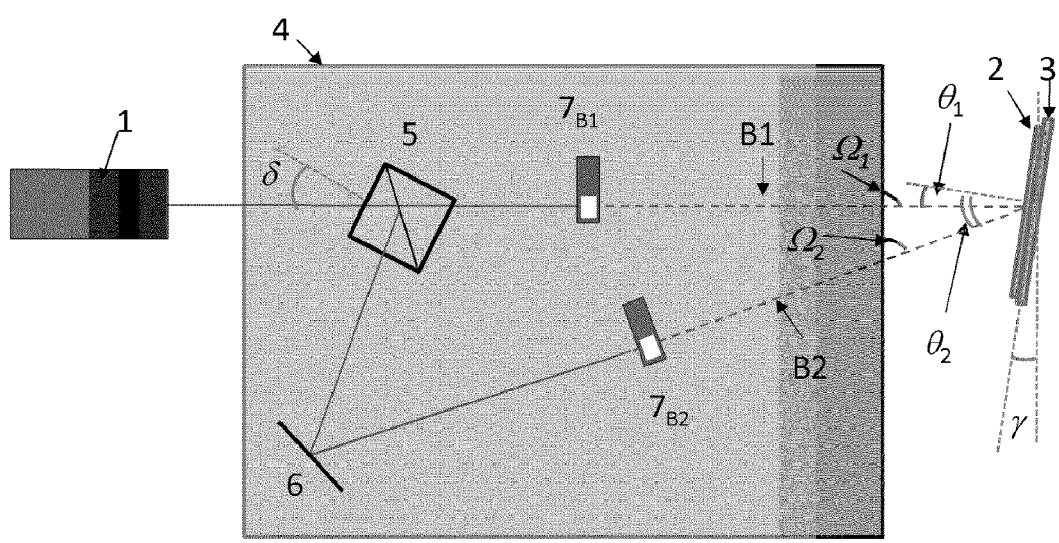
FIG. 4C is a diagram of the path of beams in a system for simultaneous recording of superimposed holographic gratings according to FIG. 4A according to an embodiment of the disclosure.

FIG. 4A is a schematic view of a system for simultaneous recording of superimposed holographic gratings in the volume of one holographic medium according to an embodiment of the disclosure, and FIG. 4C shows a path of beams in the system for simultaneous recording of superimposed holographic gratings according to FIG. 4A according to an embodiment of the disclosure.

The coherent light source 1 in the form of a laser generates continuous coherent light (initial beam), which enters the decoherence unit 4 forming at least two recording beams.

The decoherence unit 4 comprises an optical forming unit (not indicated), consisting of, optically coupled, a beam splitter 5, for example, in the form of a beam splitting cube, a mirror element 6, and at least two optical beam shutters $7_{B1}$, $7_{B2}$.

The initial beam, continuously generated by the coherent light source 1, enters the decoherence unit 4 and falls on the beam splitting cube 5, while the angle of incidence of the primary beam (δ) can range from minus 90 degrees (excluding this value) to plus 90 degrees (excluding this value) to the normal relative to the input face of the beam-splitting cube 5. In the beam-splitting cube 5, the primary beam is split into two secondary beams, which will then function as recording beams. The splitting (geometric and energy) of the primary beam into two recording beams B1 and B2, and, accordingly, formation of two recording channels (see FIGS. 4A and 4C) occurs according to the laws of reflection and refraction, where the ratio of energies of the recording beams can be, e.g., 10:90, 40:60, 50:50.

Further geometry of propagation of the recording beams B1 and B2 in the decoherence unit 4 and the direction of their exit from the unit 4 towards the stack of the holographic medium layer 2 and the master DOE/HOE 3 is determined by the value of surface period d of the master DOE/HOE 3, the wavelength of initial radiation (k), the refractive index n of the recording material layer 2 (holographic medium), in which two superimposed holographic gratings with the same surface period d, but with two unequal spatial periods ($d_{spat1}$, $d_{spat2}$) will be recorded, i.e., $d_{spat1}$ is the spatial period of the first grating G1, $d_{spat2}$ is the spatial period of the second grating G2, and, e.g., $d_{spat1} < d_{spat2}$. In this case, the recording beams leave the decoherence unit 4 at output angles $\Omega_i$ (where i is the number of the recording beam, see FIG. 4C). Output angles $\Omega_1$ and $\Omega_2$ for each recording beam B1 and B2 are different. One of the recording beams, or particularly the recording beam B1, is guided directly from the beam splitting cube 5 at an angle of incidence θ1 onto the stack of the holographic medium layer 2 and the master DOE/HOE 3, in this case the angle of incidence θ1 is calculated according to Equation 1 from set values d, n, λ and $d_{spat1}$.

$$\theta_i = \sin^{-1}\left[n\left(\lambda/(dn) - \sin\left(\sin^{-1}\left(\frac{\lambda}{2nd_{spati}}\right) + \cos^{-1}\left(\frac{d_{spati}}{d}\right)\right)\right)\right], \quad \text{Equation 1}$$

where i is the recording beam number.

Here, the angle $\theta_i$ of incidence of the recording beam on the stack of the recording material layer 2 and the master DOE/HOE 3 is related to the angle $\Omega_i$ of its output from the decoherence unit 4 according to the Equation 2.

$$\theta_i = 90 - \Omega_i + \gamma, \quad \text{Equation 2}$$

where i is the recording beam number, γ is the angle between the decoherence unit 4 and the stack of the recording material layer 2 and the master DOE/HOE 3. Here, the angle γ can take values from minus 90 degrees (excluding this value) to plus 90 degrees (excluding this value).

The angle $\theta_2$ of incidence of the second recording beam B2 is determined similarly by Equation 1 from values of d, n, λ and $d_{spat2}$. The obtained value of the angle $\theta_2$ of incidence determines the spatial and angular position of a mirror element 6 mounted in the decoherence unit 4 forming the second recording channel; in this case, the necessary condition for its orientation is the intersection of both recording beams B1, B2 at one point of the stack of the holographic medium layer 2 and the master DOE/HOE 3. The inventors carried out a number of experimental studies of the system for simultaneous recording of superimposed holographic gratings according to the schemes shown in FIGS. 4A and 4C, where the angles $\theta_1$, $\theta_2$ of incidence of recording beams were determined with the following parameters: surface period of the first and second gratings G1, G2 d=445 nm; refractive index of holographic medium layer 2 n=1.5; wavelength of primary radiation from the light source 1 $\lambda$=515 nm; spatial period of the first grating G1 $d_{spat1}$=184 nm; and spatial period of the second grating G2 $d_{spat2}$=226 nm.

Furthermore, the initial beam emitted by the continuous coherent light source 1 falls on the light splitting cube 5, which splits the primary beam into at least two recording beams (B1, B2), thus forming at least two channels, one for the first recording beam B1 and second for the second recording beam B2 (the recording beam numbers is not limited to two, but is presented as a non-limiting example). In this case, at least two optical beam shutters $7_{B1}$, $7_{B2}$ provide alternate output of recording beams with a frequency of approximately 100 Hz in response to a signal from the control unit 8, which also controls the continuous light source 1.

FIG. 4B shows sequence diagrams that illustrate the operation of two optical beam shutters $7_{B1}$, $7_{B2}$ for two recording beams B1 and B2, respectively according to an embodiment of the disclosure. According to the sequence diagram, at each instant only one optical beam shutter operates, and at output of the decoherence unit 4, said recording beams, for example, B1 or B2, are alternately output onto the stack of the holographic medium layer 2 and the master DOE/HOE 3, at the latter of which at least one diffractive/holographic structure (grating) is pre-recorded. The beams B1 or B2 alternately illuminate the holographic medium layer 2 and the master DOE/HOE 3, arranged in direct contact with the holographic medium layer 2 or at a given fixed distance from it, on which all processes of formation and recording of holographic gratings that are presented and described with reference to FIGS. 2A and 2B for beams B1 (FIG. 2A) and B2 (FIG. 2B), respectively. Moreover, FIG. 4B, illustrating the operation sequence diagram of optical beam shutters for beams B1 and B2, shows alternate closing and opening of the optical beam shutters, i.e., at some instant t1 the shutter $7_{B1}$ is open, and the recording beam B1 is output from the decoherence unit 4, at the same instant t1 the shutter $7_{B2}$ is closed and propagation of the beam B2 is blocked, and at instant t2, when the shutter $7_{B1}$ is closed, the shutter $7_{B2}$ is open and emits beam B2 onto the holographic medium layer 2 and the master DOE 3, and by said alternate illumination with beams B1 or B2, the process of forming superimposed holographic gratings is provided, while each holographic grating is recorded in small portions (exposures), for example, at instant t1, the recording beam B1 records a small portion of the holographic grating G1, and formation of the holographic grating G1 is ensured for several tens to hundreds of operation cycles of the $7_{B1}$ shutter, e.g., 50-150 cycles; a similar process occurs for the recording beam B2, by which the holographic grating G2 is formed. Here, the duration of the cycles can be, for example, 8, 9, 10 ms at operation frequency of the optical beam shutters $7_{B1}$, $7_{B2}$ of about 100 Hz. Accordingly, times of opening the shutters are spaced apart in time, therefore, in fact, the holographic gratings G1 and G2 are recorded sequentially within one recording cycle, but since the shutter speed is high (100 Hz) and the number of cycles is large, they are recorded simultaneously on the time scale of full exposure of superimposed holograms G1, G2.

Furthermore, it should be noted that the initial coherent beam continuously emitted from the light source 1 interferes with each separate recording beam coming out of the decoherence unit 4, but the recording beams leaving the decoherence unit 4 do not interfere with each other. This effect is provided by the optical circuit structure of the decoherence unit 4 and the choice of its operation parameters, which are regulated by the control unit.

Thus, in contrast to the related art techniques, the recording system according to the preferred embodiment, shown in FIG. 4A, and the scheme of the path of beams in the system, shown in FIG. 4C, provide the following effects:

the decoherence unit 4 ensures formation of a plurality of recording beams (at least two beams) from one light source 1;

at least two recording beams, leaving the decoherence unit 4, do not interfere with each other;

the multiple recording beams coming out from the decoherence unit 4 are used to record multiple superimposed holograms from a common master DOE/HOE 3;

moreover, the beams are emitted from a single light source.

Further, possible implementations of the system for simultaneous recording of superimposed holographic gratings according to the disclosure will be disclosed.

Figure 10A:
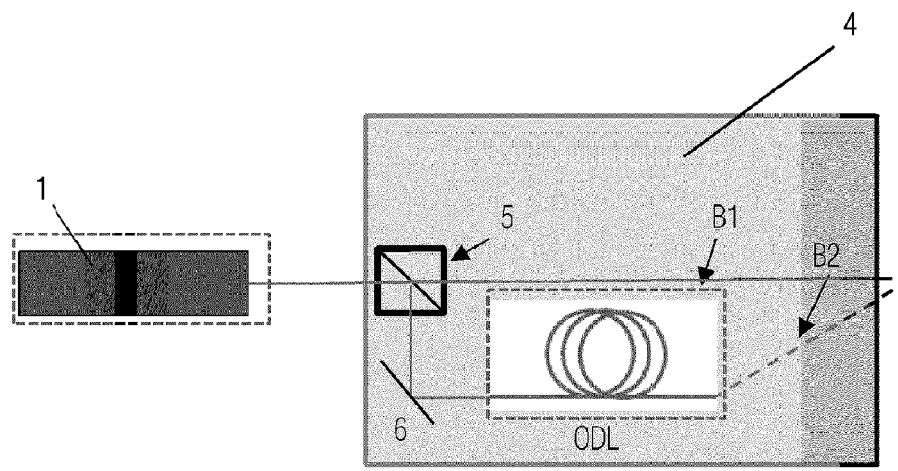
FIG. 10A is a schematic view of a system for simultaneously recording superimposed holographic gratings according to a second embodiment of the disclosure.

FIG. 10A shows an embodiment of a system for simultaneous recording of superimposed holographic gratings for augmented reality devices according to a second embodiment of the disclosure, in which the light source 1 is a pulsed light source; pulse duration is 5-10 ns; pulse repetition rate is 10 Hz-100 kHz; the primary beam at the exit of the light source 1 and at the entrance to the decoherence unit 4 is a sequence of pulses. In the decoherence unit, the optical forming unit is structurally different from the embodiment shown in FIGS. 4A and 4C, and comprises a beam-splitting cube 5, a mirror element 6 and an optical delay line (ODL). However, as in the example of FIGS. 4A and 4C, after the beam splitter 5, for example, in the form of a beam splitting cube, at least two recording channels are formed, and, accordingly, at least two recording beams B1, B2 are formed. In one or more recording channels, a pulsed recording beam, e.g., B2, propagates along the optical delay line (ODL), for example in the form of an optical fiber, the length of the fiber in the different recording channels being different. Thus, by varying the length of the optical fiber in the recording channels, it is possible to provide a delay of the light pulse in the recording channels by a certain amount relative to the non-delayed pulse, in this case, the recording beam B1, propagating through air or in a vacuum, and a delay of pulses in different channels with different fiber length relative to each other. For example, an optical fiber with a refractive index of 1.490 can be used; and a segment of 250 m of such a fiber provides a delay of the light pulse relative to the pulse propagating in vacuum by about 1.2 s. Thus, at output of the decoherence unit 4, at least two pulse recording beams, e.g., B1, B2, will be formed, shifted relative to each other by time Δt at the instant of exit from the decoherence unit 4. Due to this, the reading beams B1, B2, B3, . . . , Bn will not interfere with each other when recording superimposed holographic gratings. Similarly to the preferred technique, these beams then illuminate the stack of the holographic medium layer 2 and the master DOE/HOE 3 and are used to record superimposed hologram copies. Each hologram copy is recorded in small exposures (portions); in this case, each portion is a separate pulse of a coherent pulsed source.

It should be noted that in another embodiment, the optical forming unit comprises a beam splitting cube, a mirror element and an optical delay line comprising an assembly of a set of mirrors. As in the example shown in FIG. 10A, a pulsed coherent light source 1 is used; in the decoherence unit 4 the primary beam is split into a number of recording channels; but the optical delay lines provided in the recording channels are implemented in the form of an assembly of a set of mirrors, which increases the optical path of the pulsed recording beam B2 and, accordingly, shifts the instant of its exit from the decoherence unit 4 (relative to another, not delayed or delayed for another time. recording beam B1). Alternatively, the optical delay line can be in the form of an extended optical medium with a high refractive index (n>1.5), and the recording beams B1, B2 can propagate through the extended optical medium with a high refractive index (n>1.5) in a form other than fiber, for example, in the form of a parallelepiped made of optical material.

Figure 10B:
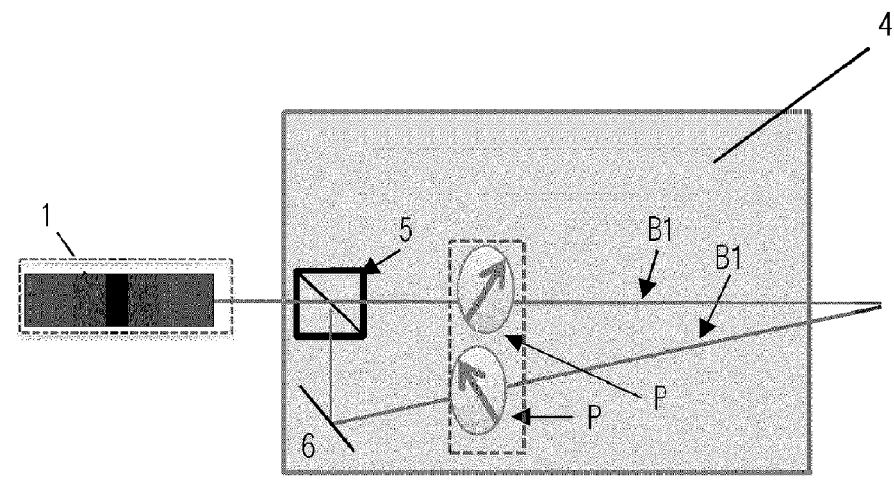
FIG. 10B is a schematic view of a system for simultaneously recording superimposed holographic gratings according to a third embodiment of the disclosure.

FIG. 10B shows an embodiment of a system for simultaneous recording of superimposed holographic gratings for augmented reality devices according to a third embodiment of the disclosure, in which the light source 1 is a continuous coherent light source or a pulsed light source (pulse duration—5-10 ns; pulse repetition rate—10 Hz-100 kHz); the primary beam at the exit of the light source 1 and at the entrance to the decoherence unit 4 is a continuous beam or a sequence of pulses. The decoherence unit 4 has an optical forming unit structurally different from the embodiment shown in FIGS. 4A, 4C and 10A, and comprises a beam splitting cube 5, a mirror element 6 and a polarizer (P). In the decoherence unit 4, the primary beam is also split into a number of recording channels; at the same time in the decoherence unit 4 in one or more recording channels, polarization planes of the recording beams B1, B2 are rotated such that they (polarization planes) become orthogonal to each other. Rotation of the polarization planes of the recording beam in the recording channel can be provided, for example, by mounting an element made of crystalline birefringent material (e.g., half-wave or quarter-wave plates made of quartz, sapphire, or magnesium fluoride) in the recording channel, or by transmitting the recording light through an optically active medium in a different physical state (for example, camphor, tartaric acid), or by applying a magnetic field (Faraday effect). Thus, the recording beams B1, B2 coming out of the decoherence unit 4 will not interfere, since they will have orthogonal polarization planes.

Figure 10C:
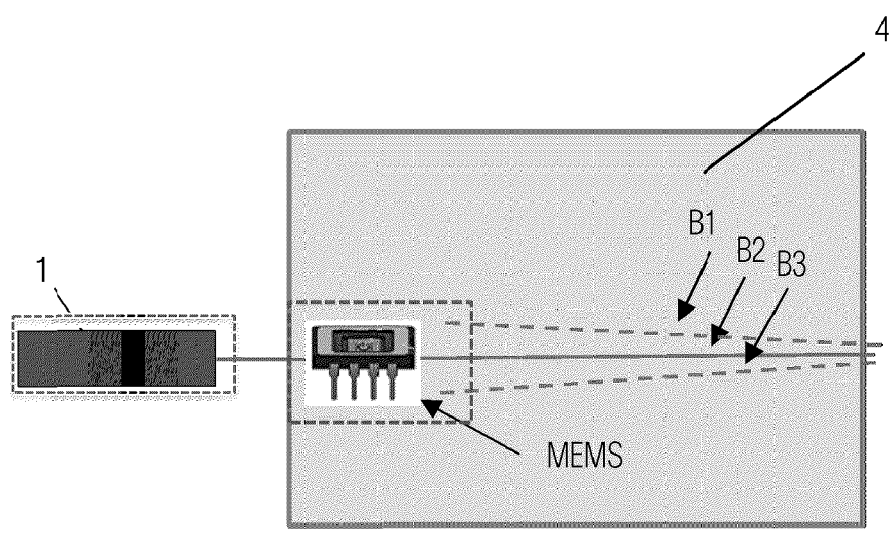
FIG. 10C is a schematic view of a system for simultaneously recording superimposed holographic gratings according to a fourth embodiment of the disclosure.

FIG. 10C illustrates an embodiment of a system for simultaneously recording superimposed holographic arrays for augmented reality devices according to a fourth embodiment of the disclosure, in which, as in the preferred embodiment of FIGS. 4A and 4C, the continuous coherent light source 1 in the form of a laser generates coherent light (initial beam), which enters the decoherence unit 4 providing the formation of at least two recording beams B1, B2.

The decoherence unit 4 comprises an optical forming unit (not indicated) in the form of at least one microelectromechanic system (MEMS scanner) comprising a miniature mirror connected to an electronic control unit 8 (not shown in FIG. 10C). Primary radiation is incident on the mirror of the MEMS scanner, and then, on command from the control unit 8, is redirected to any recording channel by rotating the mirror; in this case, the instant of redirecting the primary radiation to any recording channel is also specified by the control unit to exclude the appearance of more than one recording beam B1, B2 at the output of the decoherence unit 4 at the same time. Thereby interference of recording beams is avoided.

It should be noted that in another embodiment (not shown) the decoherence unit 4 is different from the embodiment shown in FIGS. 4A and 4C, and comprises an optical forming unit including one optical beam shutter mounted on the path of the initial beam, a beam-splitting cube 5, and a mirror element 6. Recording beams leaving the unit 4 do not intersect on the recording material layer (holographic medium layer), but fall onto different parts of it. In a separate recording cycle, each recording beam forms a holographic grating at its point of incidence. Between recording cycles, the holographic medium and the master DOE/HOE are displaced such that the points of incidence of the recording beams change. For example, in a first recording cycle, recording beam 1 is incident on the holographic medium at conditional point 1, beam 2 is incident at conditional point 2. Then, in a second recording cycle, beam 1 is incident on the holographic medium at point 2, and beam 2 is incident at point 1. Thereby interference of recording beams is avoided. Thus, during execution of the required number of recording cycles, each recording beam should form a holographic grating over its entire area.

In another embodiment (not shown), the decoherence unit 4 is different from the embodiment shown in FIGS. 4A and 4C, and comprises an optical forming unit including a beam splitting cube 5, a mirror element 6 and two spectral filters in two recording channels. Recording beams leaving the unit 4 have different wavelengths. Thereby interference of recording beams is avoided.

When implementing the process of recording (copying) a holographic grating, it is possible to change energy characteristics of recording beams, such as the power, power distribution over the aperture of the recording beams, duration of one recording cycle and the number of such cycles to create a specified diffraction efficiency (DE) distribution in the recorded holographic grating over one or more spatial coordinates (XYZ), for example, by signal from the control unit 8.

Diffraction efficiency is one of the most important parameters of holograms and is defined as the ratio of the energy diffracted in a given order to the energy of radiation incident on a diffractive optical element, in this case the radiation incident on at least one holographic/diffraction grating recorded in the master DOE/HOE 3.

Figure 5A:
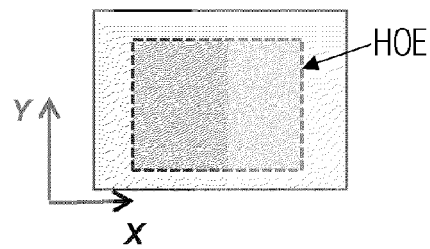
FIG. 5A is a schematic representation of a one-segment holographic grating (HOE) according to an embodiment of the disclosure.
Figure 5B:
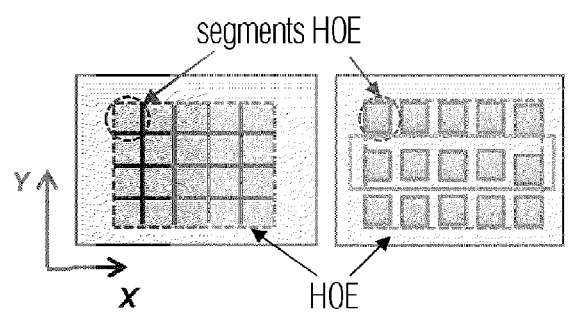
FIG. 5B is a schematic representation of a holographic grating (HOE) formed by multiple-segment recording according to an embodiment of the disclosure.
Figure 5C:
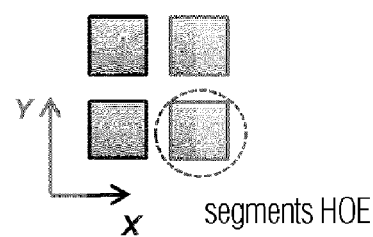
FIG. 5C is a schematic representation of segments of a multiple-segment recorded holographic grating (HOE) according to an embodiment of the disclosure.

FIGS. 5A, 5B, and 5C show schematic images of a single-segment holographic grating (HOE), a multiple-segment recorded holographic grating (HOE), and segments of a multiple-segment recorded holographic grating (HOE), respectively, according to various embodiments of the disclosure.

Figure 6A:
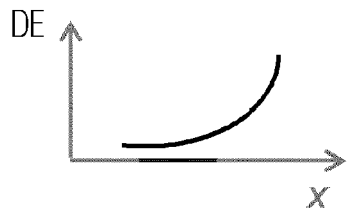
FIG. 6A is a graph illustrating a variant of distribution of diffraction efficiency (DE) along the X-axis of the field of recorded one-segment holographic grating according to an embodiment of the disclosure.
Figure 6B:
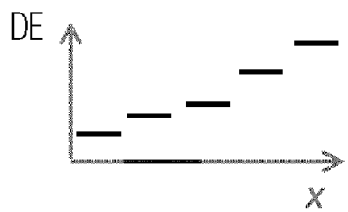
FIG. 6B is a graph illustrating a variant of distribution of diffraction efficiency (DE) of segments of multiple-segment recorded holographic grating (HOE) along the X-axis of the field of the recorded holographic grating according to an embodiment of the disclosure.
Figure 6C:
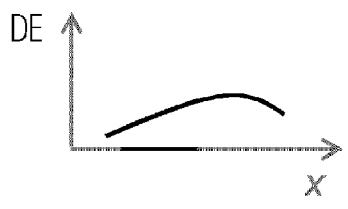
FIG. 6C is a graph illustrating a variant of distribution of diffraction efficiency (DE) within one segment of multiple-segment recorded holographic grating (HOE) along the X-axis of the field of the recorded holographic grating according to an embodiment of the disclosure.

Further, FIGS. 6A, 6B, and 6C show non-limiting examples of possible variation of diffraction efficiency (DE) of the produced hologram copies.

FIG. 6A illustrates distribution of diffraction efficiency, for example, along the X-axis of the field of a holographic grating (HOE) recorded as a whole and shown in FIG. 5A according to an embodiment of the disclosure.

FIG. 6B illustrates distribution of diffraction efficiency of segments of holographic grating (HOE), formed by multiple-segment recording (i.e., from segment to segment, HOE segments)), for example, along the X-axis, as shown in FIG. 5B, where the segments can be adjacent to each other, as shown in the left diagram of FIG. 5B, or spaced apart as shown in the right diagram of FIG. 5B, at a distance of 1 nm-100 cm according to an embodiment of the disclosure.

FIG. 6C illustrates distribution of diffraction efficiency (DE) within one segment of a multiple-segment recorded holographic grating (HOE), as shown in FIG. 5B, for example, along the X-axis of the field of the holographic grating being recorded according to an embodiment of the disclosure.

Through setting a predetermined distribution of the diffraction efficiency (DE) of the holographic grating being recorded, it is possible to adjust brightness over the field of view and improve quality of the resulting virtual image.

Simultaneous recording of superimposed holographic gratings from a DOE/HOE master by a single coherent light source, implemented according to the method and system for recording superimposed holographic gratings for augmented reality devices according to the disclosure, relies on the following key steps, which will be described with reference to FIG. 7.

Figure 7:
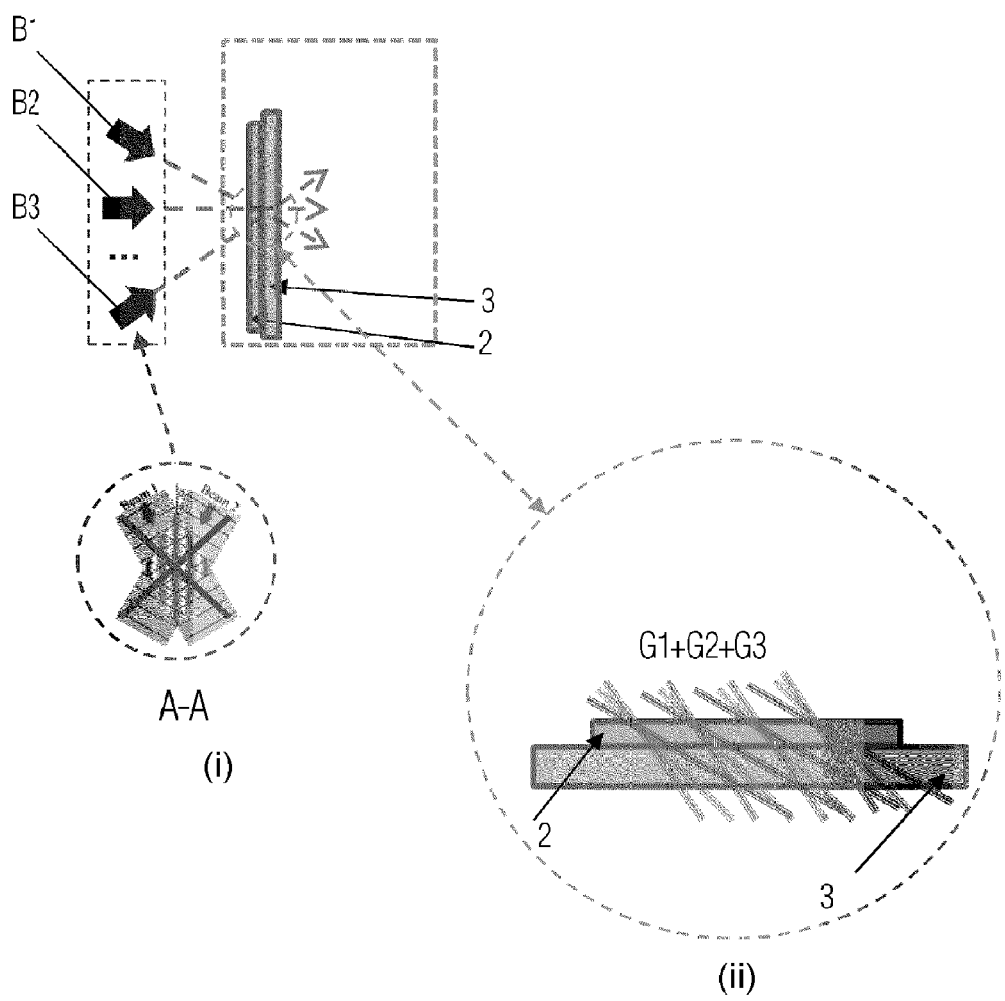
FIG. 7 is a schematic diagram of simultaneous recording of superimposed holographic gratings G1+G2+G3 at output of recording beams from a decoherence unit according to an embodiment of the disclosure and formation of first, second and third superimposed holographic gratings G1+G2+G3 with the same surface period according to an embodiment of the disclosure.

(i) of FIG. 7 shows a schematic diagram of simultaneous recording of superimposed holographic gratings G1+G2+G3 after leaving the decoherence unit according to an embodiment of the disclosure.

(ii) of FIG. 7 shows a schematic diagram of formation of first, second and third superimposed holographic gratings G1+G2+G3 with the same surface period, according to an embodiment of the disclosure.

Multiple recording beams, for example B1, B2, B3 (the recording beam numbers is not limited to three, but is presented as a non-limiting example) (see (i) of FIG. 7), which leave the decoherence unit 4 (see FIG. 1), simultaneously illuminate the holographic medium layer 2 and the master DOE/HOE 3 at a plurality of predetermined incidence angles. Moreover, the angles of incidence of each of the beams B1, B2, B3 will differ from each other.

1) Recording beams B1, B2, B3 diffract on the holographic/diffraction grating recorded in the master DOE/HOE 3.
2) Recording and diffracted beams interfere with each other, while simultaneously recording superimposed holographic gratings in the holographic medium layer 2.

With that the following effects are achieved:
multiple recording beams record superimposed holographic gratings from one coherent light source, see FIG. 1;
recorded superimposed holographic gratings have the same surface period, but a different spatial period of the recorded holographic gratings, see FIGS. 2A and 2B (and also FIGS. 7A and 7B), where in the holographic gratings G1, G2, G3 the surface period is the same, but the spatial period is different;
multiple recording beams do not record parasitic holographic gratings owing to the destruction of coherence of the recording beams by the decoherence unit 4.

Thus, owing to the above basic principles of the disclosure, the following new essential steps of the method are provided, which distinguish the disclosure from the related art:
multiple superimposed holographic gratings are recorded simultaneously (in parallel) in one volume of the holographic medium from one master DOE/HOE by one coherent light source;
each recording beam of beams B1, B2, B3 (see (i) of FIG. 7) performs recording of respective holographic grating in the holographic medium layer 2 independently of the other recording beams;
multiple recording beams from beams B1, B2, B3 do not record parasitic holographic gratings.

With that, according to the method and system for recording superimposed holographic gratings for augmented reality devices according to the disclosure, the following effects are achieved:

Identical surface periods of the recorded superimposed holographic gratings (G1+G2+G3) are provided (see (i) of FIG. 7), which improves quality of the virtual image and prevents moiré.

The process of recording superimposed holographic gratings is carried out in parallel, which is beneficial for mass production of hologram copies.

The recording setup is not sophisticated and the recording process is very fast (compared to the related art sequential two-beam recording), which is beneficial for mass production of hologram copies.

The process of recording does not require high labor input and expensive and/or high-precision components in the setup, which reduces the cost of producing hologram copies and the cost of the system for recording superimposed holographic gratings for augmented reality devices.

The following are examples of implementation, which provide variation of parameters of hologram copies in the process of simultaneous recording by changing the relative position of the holographic medium layer and the master DOE/HOE.

Figure 8A:
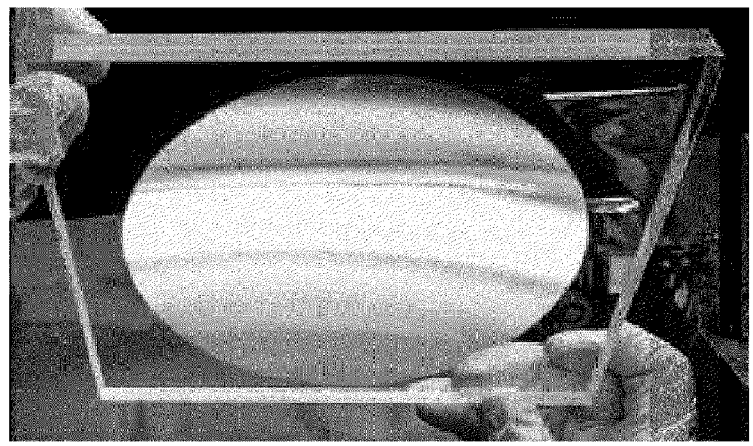
FIG. 8A is a schematic view of a master HOE with a recorded holographic grating according to an embodiment of the disclosure.

FIG. 8A is a schematic view of a master HOE with a recorded holographic grating according to an embodiment of the disclosure.

Figure 8B:
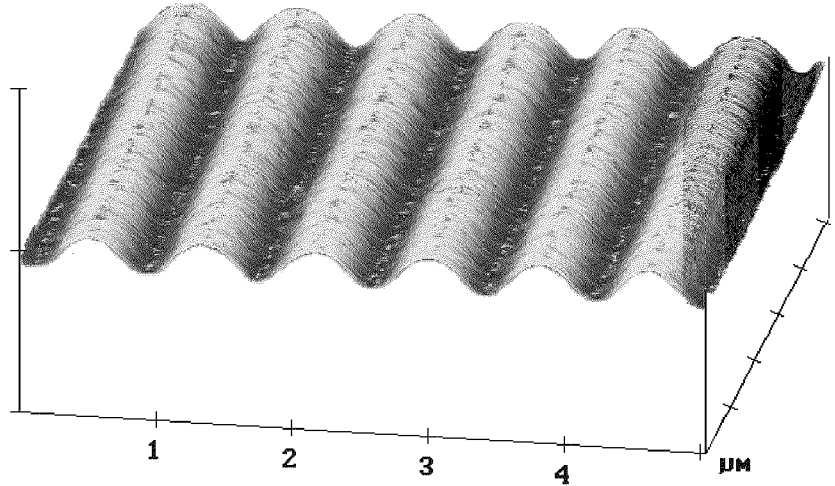
FIG. 8B is a schematic view of a master diffractive optical element (DOE) with a recorded surface relief grating according to an embodiment of the disclosure.

FIG. 8B is a schematic view of a master DOE with a recorded surface relief grating according to an embodiment of the disclosure.

Master HOE is a holographic grating (see FIG. 8A), while master DOE (FIG. 8B) is a surface-relief grating. Within the scope of disclosure, the choice of a specific implementation of master DOE/HOE is determined by various conditions, for example, the choice of master DOE/HOE depends on the required parameters of recorded hologram copies and the selected parameters of light sources and optics. Since when choosing a master DOE or a master HOE the concept of recording holograms does not differ in principle, the term DOE/HOE master is used herein.

It should be noted that master DOE/HOE may contain two or more initial (primary) diffraction gratings/holographic gratings recorded therein to enable simultaneous recording of multiple superimposed holographic gratings in the recording material layer 2 (hereinafter, holographic medium layer 2).

Using the method, two or more superimposed gratings are simultaneously recorded in a holographic medium using one recording beam from one master DOE/HOE comprising two or more diffraction/holographic gratings. (i) of FIG. 7 illustrates recorded superimposed gratings.

Figure 9A:
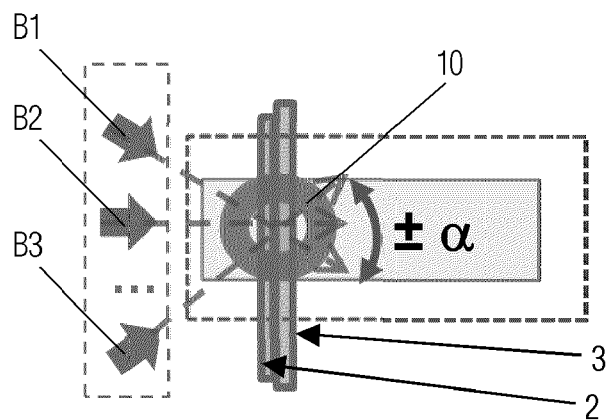
FIG. 9A is a schematic diagram of simultaneous recording of superimposed holographic gratings when the stack of recording (holographic) material layer 2 and DOE/HOE master 3 is rotated relative to recording beams according to an embodiment of the disclosure.

FIG. 9A shows a schematic diagram of simultaneous recording of superimposed holographic gratings when the stack of the holographic medium layer 2 and the master DOE/HOE is rotated according to an embodiment of the disclosure.

Here, recording beams B1, B2, B3 are directed to the holographic medium layer 2 and the master DOE/HOE, moreover, in response to a signal from the control unit 8 after the end of one recording cycle, the stack of the holographic medium layer 2 and the master DOE/HOE is rotated by angle ±α to perform the next recording cycle with the same recording beams. To perform the rotation, the stack of the holographic medium layer 2 and the master DOE/HOE can be placed on a rotary stage 10 (see FIG. 9A). In this case, the holographic medium layer 2 and the master DOE/HOE are fixed relative to each other, for example, the holographic medium layer 2 can be directly glued to the master DOE/HOE or fixed relative to the master DOE/HOE at a given distance, providing processes of recording on said elements.

By so doing, a larger number of superimposed holograms with different characteristics of holographic gratings (grating periods, tilts of holographic planes, grating vectors, etc.) are recorded using one master DOE/HOE as compared to the case where the stack of the holographic medium layer 2 and the master DOE/HOE is angularly fixed relative to the recording beams. It should be noted that with such recording, the surface periods of all recorded superimposed holographic gratings coincide, but the spatial periods of the recorded holographic gratings may differ from each other.

Figure 9B:
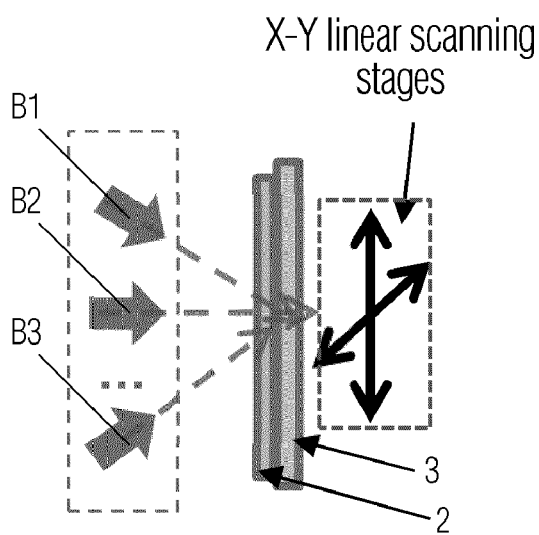
FIG. 9B is a schematic diagram of simultaneous recording of superimposed holographic gratings at linear displacement of the stack of recording (holographic) material layer 2 and DOE/HOE master 3 relative to recording beams according to an embodiment of the disclosure.

FIG. 9B shows a schematic diagram of simultaneous recording of superimposed holographic gratings with linear displacement of the stack of the holographic medium layer 2 and the master DOE/HOE, using at least one linear translator according to an embodiment of the disclosure.

In this case, recording beams B1, B2, B3 are directed to the holographic medium layer 2 and the master DOE/HOE, and since the aperture of the recording beams may be insufficient for recording a large hologram copy, the inventors propose to perform linear translation of the stack of the holographic medium layer 2 and master DOE/HOE relative to the recording beams, thereby increasing the size of recorded hologram copies. Thus, in response to a signal from the control unit, the stack of holographic medium layer 2 and the master DOE/HOE is linearly translated along the XY axes between recording cycles relative to the recording beams B1, B2, B3 that are incident on the stack of holographic medium layer 2 and the master DOE/HOE 3. This displacement increases the size of multiple-segment recorded holographic gratings.

Here, the holographic medium layer 2 and the master DOE/HOE are fixed relative to each other, for example, the holographic medium layer 2 can be directly glued to the master DOE/HOE or fixed relative to the master DOE/HOE at a given distance providing processes of recording on the specified elements.

FIGS. 5B and 5C are views of individual segments of the recorded holographic grating; they can be adjacent to each other (see FIG. 5B) or spaced apart from each other (see FIG. 5C), while the overall size of the multiple-segment recorded holographic grating is limited by the dimensions of the master DOE/HOE.

Referring to FIGS. 9C, 11A, 11B, and 11C, variants of the method and system for simultaneous recording of holographic gratings will be considered when the holographic medium layer 2 and the master DOE/HOE 3 are displaced or rotated relative to each other.

Figure 9C:
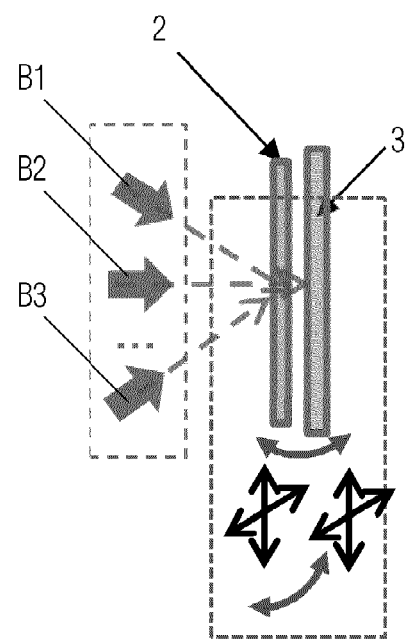
FIG. 9C is a schematic diagram of simultaneous recording of superimposed holographic gratings at linear displacement or rotation of recording (holographic) material layer 2 relative to master DOE/HOE 3 or vice versa according to an embodiment of the disclosure.
Figure 11A:
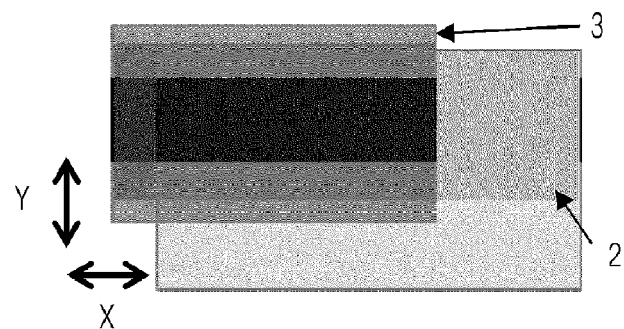
FIG. 11A is a schematic diagram of simultaneous recording of superimposed holographic gratings at linear displacement of recording (holographic) material layer 2 relative to master DOE/HOE 3 between recording cycles according to an embodiment of the disclosure.
Figure 11B:
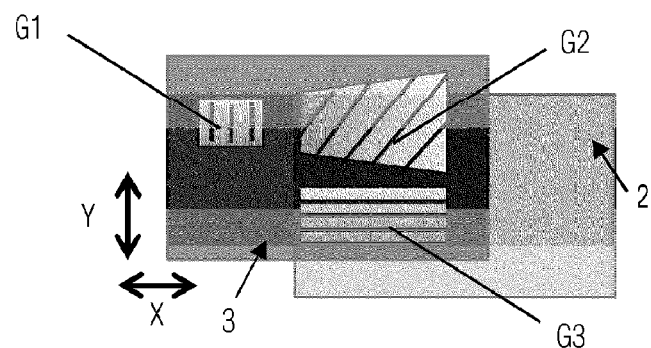
FIG. 11B is a schematic diagram of simultaneous recording of superimposed holographic gratings at linear displacement of recording (holographic) material layer 2 relative to master DOE/HOE 3 between recording cycles, if there are two or more initial diffraction/holographic gratings recorded on the master DOE/HOE 3 according to an embodiment of the disclosure.
Figure 11C:
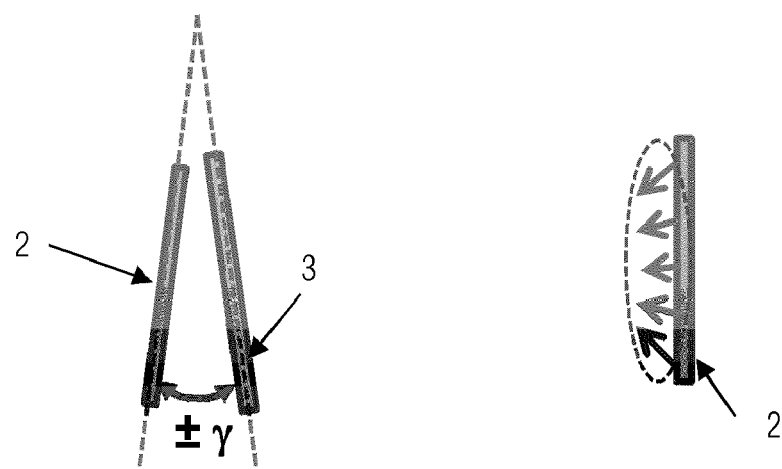
FIG. 11C is a schematic diagram of simultaneous recording of superimposed holographic gratings at angular displacement of the recording (holographic) material layer 2 relative to master DOE/HOE between recording cycles according to an embodiment of the disclosure.

FIG. 9C is a schematic diagram of simultaneous recording of superimposed holographic gratings with linear displacement or rotation of the holographic medium layer 2 relative to the master DOE/HOE 3 or vice versa according to an embodiment of the disclosure, and FIGS. 11A, 11B, and 11C show different variants of possible displacements of the holographic medium layer 2 and the master DOE/HOE 3.

FIG. 11A shows a schematic diagram of recording with linear displacement of the holographic medium layer 2 relative to the master DOE/HOE 3 between recording (exposure) cycles according to an embodiment of the disclosure. This recording method provides a copy hologram, the area of which exceeds the area of primary holographic or diffraction gratings recorded on the master DOE/HOE 3.

FIG. 11B shows a schematic diagram of recording with linear displacement of the holographic medium layer 2 relative to the master DOE/HOE when the master DOE/HOE comprises a plurality of recorded original holographic gratings according to an embodiment of the disclosure. Furthermore, if there is a need to implement a different recording sequence or a different arrangement of gratings in the copy hologram, then by displacing the holographic medium layer 2 along the X or Y axes, the recording sequence or arrangement of the hologram copies is changed, using the recording beams, compared to the original holographic or diffraction gratings G1, G2, G3, recorded on the master DOE/HOE 3.

FIG. 11C shows a schematic diagram of recording with an angular displacement, for example by angle of $\pm\gamma$, of the holographic medium layer 2 relative to the master DOE/HOE 3 between recording cycles according to an embodiment of the disclosure. By changing the tilt angle of the holographic medium layer 2 relative to the master DOE/HOE 3, a greater variety of holographic copies can be produced during the recording process, since changing the tilt angle enables formation of hologram copies with varied values of the grating vector, as shown in FIG. 11C on the right.

Thus, varying the relative position, tilt angles and rotations of the holographic medium layer 2 relative to the master DOE/HOE 3 and vice versa ensures the production of a large number of holographic copies with different periods, directions of the grating vector, sizes, recording order, and relative position in the holographic medium layer.

The inventors have carried out a series of studies on the parameters of similar related art methods and systems for sequential recording in comparison with the method and system for simultaneous recording of superimposed holographic gratings for augmented reality devices according to the disclosure. Moreover, a recording method described in US 2019/0339558A1 was considered as a non-limiting example.

The studies were carried out according to the following criteria: 1) recording speed for three superimposed holograms; 2) number of superimposed holograms produced in one recording cycle, 3) quality of virtual image, 4) cost of production.

Results of the comparative analysis are as follows:

1) recording speed for recording three superimposed holograms:
   method of the disclosure—5 sec
   method of US 2019/0339558—25 sec.
2) number of superimposed holograms produced in one recording cycle:
   method of the disclosure—2 or more
   method of US 2019/0339558—1.
3) virtual image quality (MTF, frequency-contrast characteristic of image at frequency of 10 lines/mm):
   method of the disclosure—0.2
   method of US 2019/0339558—0.05
4) cost of production:
   method of the disclosure—moderate
   method of US 2019/0339558—high.

Furthermore, FIGS. 3A and 3B show virtual images produced by a related art method of sequential recording (FIG. 3A) and by a method of simultaneous recording (FIG. 3B), demonstrating a higher quality of the resulting virtual image with uniform image brightness over the field of view and image clarity, as clearly seen in FIG. 3B, compared to the virtual image produced by the sequential recording system shown in FIG. 3A.

Thus, the above comparative analysis clearly shows that the method provides a higher quality of virtual image, simplifies the scheme of recording superimposed holograms and the recording process as such; the method and the superimposed recording system mitigate requirements on parameters of the recording system, for example, in contrast to related art systems of sequential recording, which do not impose strict requirements on vibration isolation, since the holographic medium layer and the master DOE/HOE are in contact with each other; no expensive or high-precision elements are required in the setup, which reduces the cost of producing superimposed holographic copies, the cost of the system for recording of superimposed holographic gratings for augmented reality devices and allows its use in mass production, and reduces the cost of the final product, in which superimposed hologram-copies made by the method are used.

Figure 13A:
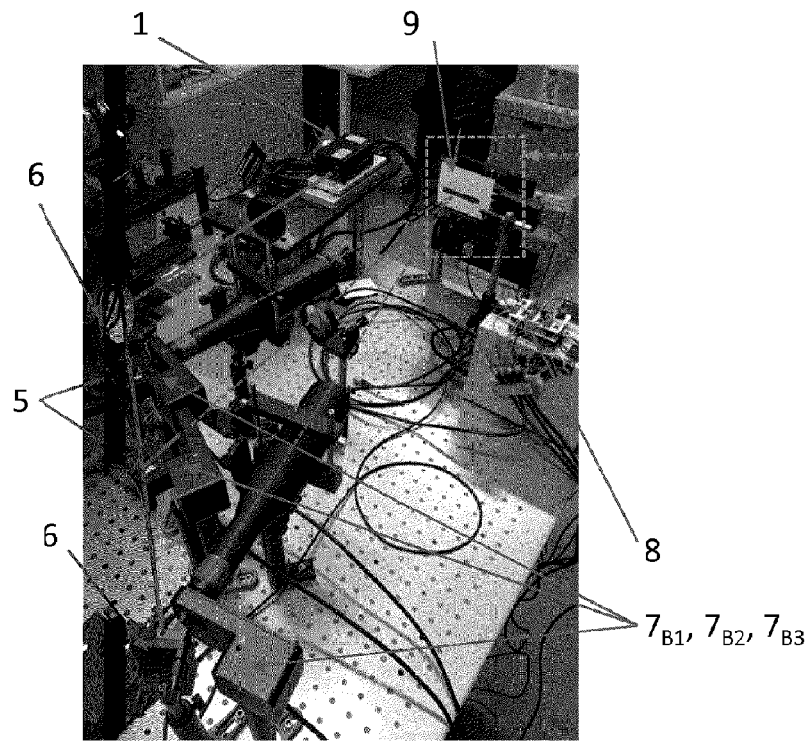
FIG. 13A is a schematic view of an experimental setup for a system for simultaneously recording superimposed holographic gratings according to an embodiment of the disclosure.

FIG. 13A is a schematic view of an experimental setup for a system for simultaneously recording superimposed holographic gratings according to an embodiment of the disclosure.

The inventors carried out experimental studies on implementation of the simultaneous recording of superimposed holographic gratings using the experimental setup (system) shown in FIG. 13A, which uses a three-channel multiple-segment recording system. A light source 1 (laser) emits coherent light; the light source used in this setup is a diode-pumped continuous-wave solid state laser, the radiation wavelength 532 nm, the radiation power 50-150 mW. Coherent beam enters through a decoherence unit 4, in this case represented as a system of optically coupled beam splitters 5, mirrors 6 and three optical shutters ($7_{B1}$, $7_{B2}$, $7_{B3}$). Beam splitters 5 are mounted in the first two channels along the path of the beam from the laser 1, after the first mirror 6; the beam is input into the third channel by the second mirror 6. Recording beams B1, B2, and B3 from three channels of the unit 4 are incident on one point of the stack of the holographic medium layer 2 and the master DOE/HOE 3, while the aperture of the recording beams is restricted by a mask 9 disposed in close proximity to the stack (2, 3). The mask 9 is designed to form the shape of the segments that make up recorded hologram copies, and comprises a diaphragm or a hole of a certain shape, which restricts the aperture of the recording beams.

Control unit 8 (FIG. 13A) alternately opens and closes the shutters. At instant t, all the shutters are closed, and for recording one segment of the hologram, the shutters $7_{B1}$, $7_{B2}$, $7_{B3}$ alternately open for short time periods t1, t2, t3, respectively, each time period being 5-100 ms. This sequence of opening and closing respective shutters is repeated tens to hundreds of times to obtain the desired exposure and form the required hologram segment.

Figure 13B:
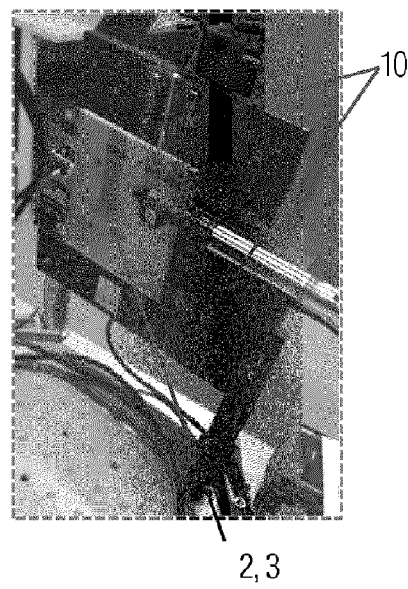
FIG. 13B is a view of a part of the experimental setup according to FIG. 13A, which shows a stack of a holographic medium layer 2 and a master HOE 3, positioned on a linear positioning stage 10, which moves, responsive to a signal from the control unit 8, the stack of holographic medium layer 2 and master HOE 3 along the XY axes according to an embodiment of the disclosure.

FIG. 13B shows a stack of a recording material layer 2 (a holographic medium layer) and a master HOE 3 mounted on a linear positioning stage 10, which moves the stack of the holographic medium layer 2 and the master HOE 3 along the XY axes, responsive to a signal from the control unit 8 according to an embodiment of the disclosure. Thus, after recording one segment of the holographic grating, the shutters $7_{B1}$, $7_{B2}$, $7_{B3}$ are in the closed position, and then, in response to a signal from the control unit 8, the linear positioning stage 10 moves the stack (2,3) to the next predetermined position for recording the next segment. Further, the cycle of recording segments of the holographic grating is repeated the required number of times, depending on the number of recorded segments of the hologram copy.

According to the disclosure, when implementing the recording process, contact and contactless methods of recording (copying) holograms are performed.

Figure 13C:
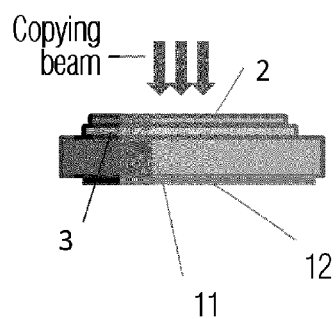
FIG. 13C is a schematic diagram of a contact recording method according to an embodiment of the disclosure.
Figure 13D:
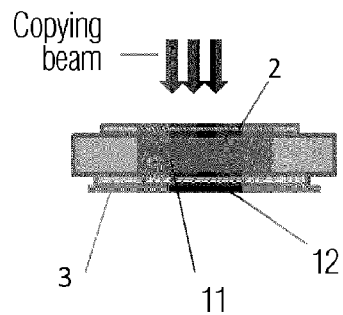
FIG. 13D is a schematic diagram of a contactless recording method according to an embodiment of the disclosure.

FIGS. 13C and 13D show variants of structure of the stack of the holographic medium layer 2 and the master HOE 3 used in the experiments according to various embodiments of the disclosure. In the case of FIG. 13C (contact recording method), the holographic medium layer 2 is fixed on the master DOE/HOE 3, which, in turn, is fixed on one side of a thin plane-parallel glass plate 11 (for example, a planar waveguide). On the opposite side of the plate, a light-absorbing material layer 12 (for example, an absorber film) is fixed to prevent re-reflection of light in the stack (2, 3), leading to the recording of unwanted (parasitic) holograms and background illumination of the holographic medium. In the case shown in FIG. 13D (non-contact recording method), a holographic medium layer 2 is fixed on one side of a thin glass plate 11 (for example, planar waveguide). On the opposite side of the plate 11, a master DOE/HOE 3 is fixed, on which, in turn, a light-absorbing material layer 12 is fixed to prevent re-reflection of light in the stack (2, 3), leading to recording unwanted (parasitic) holograms and background illumination of the holographic medium.

Figure 12:
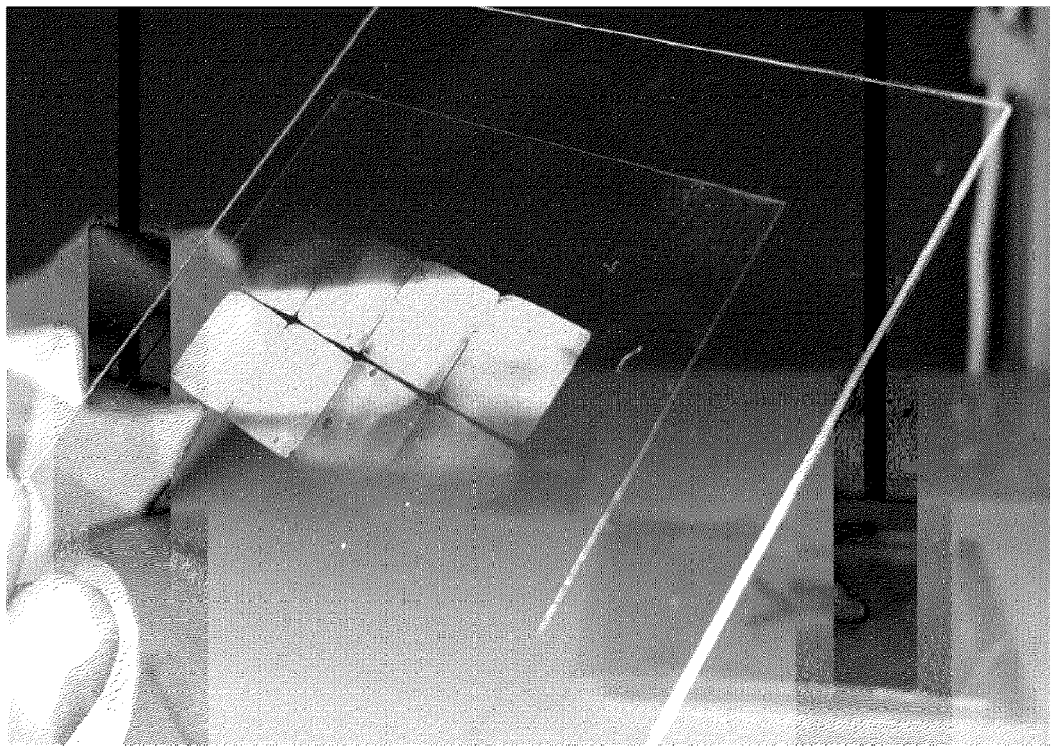
FIG. 12 is a schematic view of a holographic grating copy produced by the method of multiple-segment recording on an experimental setup according to an embodiment of the disclosure.

FIG. 12 shows a holographic grating copy produced by the multiple-segment recording method on an experimental setup according to FIGS. 13A and 13B according to an embodiment of the disclosure. Thus, the experimental studies carried out by the inventors demonstrated the production of high-precision copies of the master HOE, implemented at an experimental setup made according to the method and system for recording superimposed holographic gratings for augmented reality devices according to the disclosure.

In the inventive system for simultaneous recording of superimposed holographic gratings for augmented reality devices according to the disclosure, which has been described with reference to FIGS. 13A to 13C, an experimental setup is provided where a three-channel multiple-segment recording system was used. In this case, the process of superimposed recording of holographic gratings is carried out on the principles of copying holograms.

In this case, the hologram recording scheme used in the disclosure differs significantly from the traditional two-beam recording system, in which coherent reference and object beams are incident on the holographic medium layer. The beams interfere with each other, and the holographic medium is disposed in the area of their interference and is illuminated by the generated interference field. As a result of physicochemical reactions in the holographic medium layer, a holographic grating with a period of the interference field is formed (recorded).

The scheme of recording according to the disclosure is described in detail with reference to FIGS. 2A and 2B, where recording beams B1, B2, formed by one light source, illuminate the holographic medium layer 2 and the master DOE/HOE 3, and part of the beams diffract ($B_{1diff}$, $B_{2diff}$) on the master DOE/HOE 3, and the diffracted ($B_{1diff}$, $B_{2diff}$) and recording beams ($B_{1rec}$, $B_{2rec}$) interfere, respectively, with each other, i.e., at each point of the holographic medium layer 2 brought into contact with the master DOE/HOE 3, interference occurs between the diffracted beams and the recording beams, with simultaneously recording superimposed holographic gratings G1 (FIG. 2A) and G2 (FIG. 2B) in the holographic medium layer 2.

Figure 14:
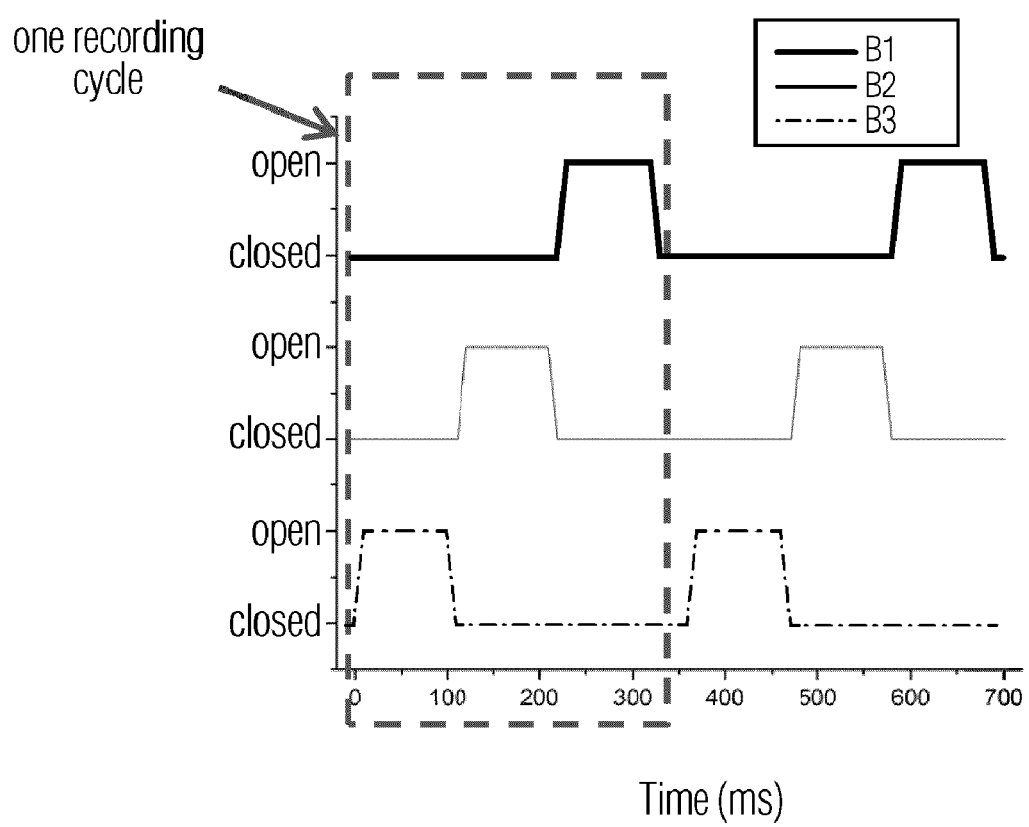
FIG. 14 shows sequence diagrams illustrating the operation of three optical beam shutters $7_{B1}$, $7_{B2}$, $7_{B3}$ for three recording beams B1, B2 and B3, respectively according to an embodiment of the disclosure.

FIG. 14 shows a sequence diagram illustrating the operation of the decoherence unit 4 in a three-channel recording scheme formed by three optical beam shutters $7_{B1}$, $7_{B2}$, and $7_{B3}$ (see FIG. 13A) according to an embodiment of the disclosure.

Multiple superimposed holographic gratings are recorded in parallel. For this, a stack of the holographic medium layer 2 and the master DOE/HOE 3 is illuminated by a plurality of recording (copying) beams (for example, three). It should be noted that the provision of three channels in the decoherence unit 4 is not limiting, but is presented as an example. Diffraction from own grating of the master DOE/HOE 3, i.e., at least one holographic or diffraction grating pre-recorded in the master DOE/HOE 3, is formed from each recording beam B1, B2, B3, and hologram copies of the own grating of the master DOE/HOE 3 are formed in the holographic medium layer 2. The processes of recording (copying) holograms for augmented reality devices are described in more detail, for example, in the publications of F. Bruder et al., Proc. SPIE, Vol. 10127, P. 101270A (2017); M. Okui et al., Appl. Opt., Vol. 57, P. 4117 (2018), which are incorporated herein by reference.

To destroy interference of recording channels in this scheme, the optical beam shutters $7_{B1}$, $7_{B2}$, and $7_{B3}$ in the channels are opened alternately. As shown in FIG. 14, first, the channel for the recording beam B1 opens for time t~100 ms, which is about 20-200 times less than the typical exposure for the Bayfol® polymer used in the experimental setup, and partial recording of a first grating in holographic medium layer 2 starts; then the channel for recording beam B2 opens, and a second grating is partially recorded for t~100 ms; then the channel for recording beam B3 opens for t~100 ms, and partial recording of a third grating starts. These three stages of partial recording of three gratings form one recording cycle. The process is repeated about 50-150 times to get full desired exposure for all three gratings. Moreover, both the duration of opening a specific recording channel and the number of recording cycles can be varied, thereby enabling a change in the diffraction efficiency of the recorded superimposed holograms and making it equal or unequal to ensure uniform brightness of the virtual image across the field of view. As a result, three superimposed holographic gratings from one master DOE/HOE 3 are recorded.

Therefore, since the shutter opening times are spaced apart, in fact, separate superimposed holographic gratings are formed sequentially during one recording cycle, but as the shutter operation speed and the number of recording cycles are high, they are recorded simultaneously on the time scale of a full exposure of all superimposed holograms.

In summary, the method and system for simultaneous recording of superimposed holographic gratings for augmented reality devices according to the disclosure have the main distinctive features:
  each holographic grating is recorded sequentially with small exposures (~100 ms);
  two or more superimposed holograms are recorded, i.e., all holograms are formed in parallel;
  50 or more recording cycles are required for full recording of superimposed holograms;
  all of the recorded superimposed holograms and the master DOE/HOE have the same surface period of holographic gratings;
  all of the recorded superimposed holograms have different spatial period of holographic gratings;
  the same or different diffraction efficiency is provided for all recorded holograms.

INDUSTRIAL APPLICABILITY

The method and system for recording superimposed holographic gratings for augmented reality devices are applicable in augmented reality glasses, HUD devices and virtual displays, displays based on plane waveguides with diffractive and holographic structures, i.e., in projection optical means using augmented reality technology, for example, for educational purposes, in computer games, in medicine, sports, 3D modeling, design, for navigation purposes.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of simultaneous recording of superimposed holographic gratings for an augmented reality device, the method comprising:
  generating an initial beam by a single light source;
  directing the initial beam to a decoherence unit at a predetermined angle;
  providing a formation of at least two recording beams by the decoherence unit, including:
  splitting the initial beam into at least two recording beams, and
  forming at least two recording channels in the decoherence unit to transmit the at least two recording beams and output them from the decoherence unit, output angles of each of the formed at least two recording beams being different, the formed at least two recording beams being non-interfering when leaving the decoherence unit, which is provided in accordance with at least one of: output times (t) of each of the at least two recording beams, spatial positions of each of the at least two recording beams, polarization states of each of the at least two recording beams, or spectral compositions of each of the at least two recording beams;
  illuminating a recording material layer and one master diffractive optical element/master holographic optical element (master DOE/HOE) comprising at least one preliminary formed diffraction/holographic grating by the at least two non-interfering recording beams; and
  providing simultaneous formation of at least two superimposed holographic gratings from the master DOE/HOE on or in the recording material layer, the formed superimposed holographic gratings having a same surface period and different spatial periods,
  wherein the at least two recording beams output from the decoherence unit propagate to converge toward the recording material layer, and the recording material layer and the master DOE/HOE are in direct contact with each other, and
  wherein an angle $\theta_i$ of incidence of the recording beam on the recording material layer and the master DOE/HOE is determined by a formula:

$$\theta_i = \sin^{-1}\left[n\left(\lambda/(dn) - \sin\left(\sin^{-1}\left(\frac{\lambda}{2nd_{spati}}\right) + \cos^{-1}\left(\frac{(d_{spati})}{d}\right)\right)\right)\right],$$

where i is a number of the recording beam, n is a refractive index of the recording material layer, $\lambda$ is a wavelength of the initial beam from the light source, d is a surface period of each recorded grating, and $d_{spati}$ is a spatial period of an i-th grating being recorded.

2. The method of claim 1, wherein the formation of the at least two superimposed holographic gratings from the master DOE/HOE on or in the recording material layer comprises:

diffracting the recording beams on the at least one diffraction/holographic grating preliminary formed on or in the master DOE/HOE, and interfering the diffracted and recording beams with each other on or in the recording material layer to provide recording of at least two superimposed holographic gratings.

3. The method of claim 1, wherein parameters of the recorded superimposed holographic gratings are adjusted by rotation or linear displacement of the recording material layer and the master DOE/HOE relative to the at least two recording beams incident on the recording material layer and the master DOE/HOE, between recording cycles.

4. The method of claim 1, wherein rotation or linear displacement of the recording material layer and the master DOE/HOE relative to each other between recording cycles is provided for adjusting parameters of the superimposed holographic gratings being recorded.

5. The method of claim 1, wherein, at a one-segment recording of a holographic grating as a whole, a diffraction efficiency is varied along an X-axis or along a Y-axis of a field of the recorded holographic grating.

6. The method of claim 1, wherein when performing multiple-segment recording of a holographic grating on or in the layer of the recording material, a diffraction efficiency is varied in the segments constituting the multiple-segment recorded holographic grating.

7. The method of claim 6, wherein varying the diffraction efficiency in the segments is performed along an X-axis or a Y-axis of a field of a respective segment of the multiple-segment recorded holographic grating on or in the recording material layer.

8. A system for simultaneous recording of superimposed holographic gratings for augmented reality devices, the system comprising:
a light source configured to generate an initial beam;
a decoherence unit configured to form and output at least two recording beams, the decoherence unit being configured such that output angles of each of the formed at least two recording beams are different, and the formed at least two recording beams being non-interfering when leaving the decoherence unit, which is provided in accordance with at least one of: output times (t) of each of the at least two recording beams, spatial positions of each of the at least two recording beams, polarization states of each of the at least two recording beams, or spectral compositions of each of the at least two recording beams;
a recording material layer configured for forming thereon or therein at least two superimposed holographic gratings, the formed superimposed holographic gratings having a same surface period and different spatial periods;
a master diffractive optical element/master holographic optical element (master DOE/HOE) comprising at least one preliminarily formed diffractive/holographic grating, positioned in direct contact with the recording material layer or at a predetermined distance from the recording material layer to ensure interaction of the recording beams with the master DOE/HOE and the recording material layer; and
a control unit connected to the light source, the decoherence unit, and the DOE/HOE master and the recording material layer, and configure to control the units by a signal from the control unit, wherein the at least two recording beams output from the decoherence unit propagate so as to converge toward the recording material layer, and wherein an angle $\theta_i$ of incidence of the recording beam on the recording material layer and the master DOE/HOE is determined by a formula:

$$\theta_i = \sin^{-1}\left[n\left(\lambda/(dn) - \sin\left(\sin^{-1}\left(\frac{\lambda}{2nd_{spati}}\right) + \cos^{-1}\left(\frac{(d_{spati})}{d}\right)\right)\right)\right],$$

where i is a number of the recording beam, n is a refractive index of the recording material layer, $\lambda$ is a wavelength of the initial beam from the light source, d is a surface period of each recorded grating, and $d_{spati}$ is a spatial period of an i-th grating being recorded.

9. The system of claim 8, wherein the light source is further configured to form an initial continuous coherent electromagnetic radiation with an optical wavelength.

10. The system of claim 8, wherein the light source is further configured to form a pulsed initial radiation.

11. The system of claim 8, wherein the light source is further configured to generate an initial beam, which comprises one of: a continuous coherent beam, a continuous partially coherent beam, a pulsed coherent beam, or a pulsed partially coherent beam.

12. The system of claim 8, wherein the decoherence unit comprises an optical forming unit configured to form at least two recording channels.

13. The system of claim 12, wherein the optical forming unit is further configured to form at least two recording channels, each recording channel being configured to transmit a respective recording beam.

14. A system for simultaneous recording of superimposed holographic gratings for augmented reality devices, the system comprising:
a coherent light source configured to form a continuous initial coherent beam;
a decoherence unit configured to form and output at least two recording beams, the decoherence unit being configured such that output angles of each of the formed at least two recording beams are different, and the formed at least two recording beams are non-interfering when leaving the decoherence unit, the decoherence unit comprising an optical forming unit configured to form at least two recording channels, each recording channel configured to transmit a respective recording beam, and the optical forming unit comprising, optically coupled, a beam splitter, at least one mirror element, and at least two optical beam shutters configured to alternately output the recording beams from the decoherence unit in accordance with an output time (t) of each of the at least two recording beams;
a recording material layer configured to form thereon or therein at least two superimposed holographic gratings, the formed superimposed holographic gratings having a same surface period and different spatial periods;
a master diffractive optical element/master holographic optical element (master DOE/HOE) comprising at least one preliminarily formed diffractive/holographic grating, disposed in direct contact with the recording material layer or at a predetermined distance from the recording material layer to ensure interaction of the recording beams with the master DOE/HOE and the recording material layer; and a control unit connected to the light source, the decoherence unit, and to the DOE/HOE master and the recording material layer, and configured to control at least one of the light source, the decoherence unit, and to the DOE/HOE master and the recording material layer by a signal from the control unit, wherein the at least two recording beams output from the decoherence unit propagate so as to converge toward the recording material layer, and wherein an angle $\theta_i$ of incidence of the recording beam on the recording material layer and the master DOE/HOE is determined by a formula:

$$\theta_i = \sin^{-1}\left[n\left(\lambda/(dn) - \sin\left(\sin^{-1}\left(\frac{\lambda}{2nd_{spati}}\right) + \cos^{-1}\left(\frac{(d_{spati})}{d}\right)\right)\right)\right],$$

where i is a number of the recording beam, n is a refractive index of the recording material layer, $\lambda$ is a wavelength of the initial beam from the light source, d is a surface period of each recorded grating, and $d_{spati}$ is a spatial period of an i-th grating being recorded.

15. The system of claim 14, wherein the master DOE/HOE is mounted in a fixed position relative to the recording material layer with an ability of rotation or linear displacement of the recording material layer and the DOE/HOE master relative to the at least two recording beams incident on the recording material layer and the master DOE/HOE, between recording cycles to adjust parameters of the superimposed holographic gratings being recorded.

16. The system of claim 14, wherein the recording material layer and the master DOE/HOE are mounted with an ability of rotation or displacement relative to each other between recording cycles to adjust parameters of the superimposed holographic gratings recorded on or in the recording material layer by a signal from the control unit.

17. The system of claim 14, wherein the control unit is configured to adjust parameters of the superimposed holographic gratings recorded on or in the recording material layer by rotating or linearly displacing the recording material layer and the master DOE/HOE relative to the at least two recording beams incident on the recording material layer and the master DOE/HOE, between recording cycles by a signal from the control unit.

* * * * *